United States Patent
Okada et al.

(10) Patent No.: US 9,209,484 B2
(45) Date of Patent: Dec. 8, 2015

(54) ALL-SOLID-STATE CELL

(71) Applicants: Kyushu University, Fukuoka (JP); NGK Insulators, Ltd., Nagoya (JP)

(72) Inventors: Shigeto Okada, Fukuoka (JP); Eiji Kobayashi, Fukuoka (JP); Kazuhiro Yamamoto, Nagoya (JP); Toshihiro Yoshida, Nagoya (JP); Yosuke Sato, Hashima-Gun (JP)

(73) Assignees: Kyushu University, Fukuoka (JP); NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/223,169

(22) Filed: Mar. 24, 2014

(65) Prior Publication Data

US 2014/0205891 A1    Jul. 24, 2014

Related U.S. Application Data

(63) Continuation of application No. 12/267,659, filed on Nov. 10, 2008, now abandoned.

(30) Foreign Application Priority Data

Nov. 12, 2007  (JP) .................................. 2007-293682
Oct. 17, 2008  (JP) .................................. 2008-268333

(51) Int. Cl.
    *H01M 10/052*    (2010.01)
    *H01M 4/58*    (2010.01)
    *H01M 10/0562*    (2010.01)

(52) U.S. Cl.
    CPC .......... *H01M 10/052* (2013.01); *H01M 4/5825* (2013.01); *H01M 10/0562* (2013.01)

(58) Field of Classification Search
    CPC ..... H01M 4/381; H01M 4/382; H01M 4/525; H01M 4/485; H01M 4/5825; H01M 4/505; H01M 4/131; H01M 10/0525; H01M 10/052; H01M 10/0562; H01M 4/405; H01M 2300/0068

See application file for complete search history.

(56) References Cited

U.S. PATENT DOCUMENTS 6,355,379 B1    3/2002    Ohshita et al.
7,288,340 B2    10/2007    Iwamoto (Continued)

FOREIGN PATENT DOCUMENTS

EP    1 826 860 A1    8/2007
EP    1 826 861 A1    8/2007

(Continued)

OTHER PUBLICATIONS

U.S. Appl. No. 12/267,668, filed Nov. 10, 2008, Okada et al.

(Continued)

*Primary Examiner* — Ula C Ruddock
*Assistant Examiner* — Thomas Parsons
(74) *Attorney, Agent, or Firm* — Burr & Brown, PLLC

(57) ABSTRACT

An all-solid-state cell has a fired solid electrolyte body, a first electrode layer integrally formed on one surface of the fired solid electrolyte body by mixing and firing an electrode active material and a solid electrolyte, and a second electrode layer integrally formed on the other surface of the fired solid electrolyte body by mixing and firing an electrode active material and a solid electrolyte. The first and the second electrode layers are formed by mixing and firing the electrode active material and the amorphous solid electrolyte, which satisfy the relation Ty>Tz (wherein Ty is a temperature at which the capacity of the electrode active material is lowered by reaction between the electrode active material and the solid electrolyte material, and Tz is a temperature at which the solid electrolyte material is shrunk by firing).

18 Claims, 26 Drawing Sheets

(56) References Cited

U.S. PATENT DOCUMENTS

| | | |
|---|---|---|
| 7,510,800 B2 | 3/2009 | Yoshida et al. |
| 7,914,932 B2 | 3/2011 | Yoshida et al. |
| 2006/0078790 A1 | 4/2006 | Nimon et al. |
| 2007/0048619 A1 | 3/2007 | Inda |
| 2007/0087269 A1 | 4/2007 | Inda |
| 2007/0172739 A1 | 7/2007 | Visco et al. |
| 2007/0175020 A1 | 8/2007 | Nagata et al. |
| 2007/0231704 A1 | 10/2007 | Inda |
| 2007/0259271 A1 | 11/2007 | Nanno et al. |
| 2011/0300451 A1 | 12/2011 | Inda |

FOREIGN PATENT DOCUMENTS

| | | |
|---|---|---|
| JP | 08-138724 A1 | 5/1996 |
| JP | 2000-251938 | 9/2000 |
| JP | 2000-311710 A1 | 11/2000 |
| JP | 2000-331684 | 11/2000 |
| JP | 2001-210360 | 8/2001 |
| JP | 2005-063958 A1 | 3/2005 |
| JP | 2007-134305 | 5/2007 |
| JP | 2007-258148 | 10/2007 |
| JP | 2007-258165 | 10/2007 |
| JP | 2007-294429 | 11/2007 |
| JP | 2008-226463 | 9/2008 |
| WO | 2007/075867 A2 | 7/2007 |
| WO | 2007/075867 A3 | 7/2007 |

OTHER PUBLICATIONS

U.S. Appl. No. 12/372,821, filed Feb. 18, 2009, Okada et al.
U.S. Appl. No. 14/219,478, filed Mar. 19, 2014, Okada et al.
Yusuke Fukushima et al., "*Fabrication of Electrode-Electrolyte Interface in All-Solid-State Lithium Batteries Using the Thermal Softening-Adhesion Behavior of $Li_2S$—$P_2S_5$ Glass Electrolytes*," Lecture Summary of Chemical Battery Material Association Meeting, vol. 9, Jun. 11, 2007, pp. 51-52.
Japanese Office Action, Japanese Application No. 2008-268333, dated Feb. 12, 2013 (partial JPO machine translation) (4 pages).
Japanese Office Action, Japanese Application No. 2009-010656, dated Mar. 19, 2013 (with English translation) (5 pages).

ALL-SOLID-STATE CELL

CROSS-REFERENCE TO RELATED APPLICATIONS

This application is a continuation of U.S. application Ser. No. 12/267,659, filed Nov. 10, 2008, which is based upon and claims the benefit of priority from Japanese Patent Application No. 2007-293682 filed on Nov. 12, 2007 and Japanese Patent Application No. 2008-268333 filed on Oct. 17, 2008 in the Japanese Patent Office, of which the contents are incorporated herein by reference.

BACKGROUND OF THE INVENTION

1. Field of the Invention

The present invention relates to an all-solid-state cell utilizing a combination of an electrode active material and a solid electrolyte material.

2. Description of the Related Art

In recent years, with the advancement of portable devices such as personal computers and mobile phones, there has been rapidly increasing demand for batteries usable as a power source thereof. In cells of the batteries for the purposes, a liquid electrolyte (an electrolytic solution) containing a combustible organic diluent solvent has been used as an ion transfer medium. The cell using such an electrolytic solution can cause problems of solution leakage, ignition, explosion, etc.

In view of solving the problems, all-solid-state cells, which use a solid electrolyte instead of the liquid electrolyte and contain only solid components to ensure intrinsic safety, have been developing. The all-solid-state cell contains a sintered ceramic as the solid electrolyte, and thereby does not cause the problems of ignition and liquid leakage, and is hardly deteriorated in battery performance by corrosion. Particularly all-solid-state lithium secondary cells can achieve a high energy density easily, and thus have been actively studied in various fields (see, for example, Japanese Laid-Open Patent Publication Nos. 2000-311710 and 2005-063958, Yusuke Fukushima and four others, "*Fabrication of electrode-electrolyte interface in all-solid-state cell lithium batteries using the thermal softening adhesion behavior of $Li_2S$—$P_2S_5$ glass electrolytes*", Lecture Summary of Chemical Battery Material Association Meeting, Vol. 9th, Pages 51-52, issued on Jun. 11, 2007)

Japanese Laid-Open Patent Publication No. 2005-063958 discloses a thin-film, solid, lithium ion secondary cell. The secondary cell described in Japanese Laid-Open Patent Publication No. 2005-063958 is a bendable thin-film cell having a flexible solid electrolyte and thin layers of positive and negative electrode active materials sputtered thereon. The electrodes of the cell have to be thin, and the amounts of the electrode active materials are limited. Thus, the cell is disadvantageous in that it is difficult to achieve a high capacity.

The article of Fukushima et al. reports formation of an electrode-electrolyte interface of a complex of a glass electrolyte and an electrode active material, utilizing softening fusion of the glass electrolyte. In this report, it is described that the resistance between electrolyte particles is effectively lowered due to the fusion of the glass electrolyte, and further a heterophase is not formed in a reaction between the electrolyte and the active material.

However, an all-solid-state cell having positive and negative electrodes is not described in this report, and it is unclear whether the reaction resistance can be lowered in the electrolyte-electrode active material interface. Further the relation between the electric properties and the fact that the heterophase is not formed is not specifically described, and the charge-discharge ability of the all-solid-state cell is unknown. Furthermore, the electrolyte used in this report is a sulfide, which is expected to be unstable in the atmosphere (air). The electrolyte may generate a toxic gas when brought into contact with the air due to breakage or the like. Thus, this technology is disadvantageous in safety.

The internal resistance of a cell is partly due to an interface between an electrode active material and an electrolyte. The resistance against transfer of electrons and Li ions through the interface during charge and discharge is hereinafter referred to as the interface reaction resistance. The present invention relates to a technology for lowering the interface reaction resistance in an all-solid-state cell system using a solid electrolyte.

For example, in the conventional lithium ion cell using the electrolytic solution, the electrolyte is a liquid containing an organic solvent, though the electrode active material is a solid. Therefore, the electrolyte can readily penetrate between particles of the electrode active material to form an electrolyte network in the electrode layers, resulting in a low interface reaction resistance.

In terms of the interface reaction resistance according to the present invention, a reaction resistance per unit area of connected particles largely depends on the combination of the active material and the electrolyte to be used. As the connected area between the particles is increased, the interface reaction resistance of the entire cell is lowered and the internal resistance is lowered such that resistances are parallel-connected in an equivalent circuit. Thus, the interface reaction resistance between the electrolyte and the active material can be lowered by (1) selecting the material combination in view of smoothly transferring the Li ions and (2) increasing the connection interface area between the electrolyte and the active material per an electrode capacity.

In the present invention, a combination of an electrode active material and a solid electrolyte containing a common polyanion or a combination of an electrode active material and a solid electrolyte of phosphate compounds is used in view of the process of (1), and a solid electrolyte is mixed with an electrode active material to form a network in an electrode layer, whereby the connection interface area between the electrode active material and the solid electrolyte is remarkably increased to lower the interface reaction resistance in view of the process of (2).

Japanese Laid-Open Patent Publication No. 2000-311710 discloses a solid electrolyte cell containing a solid electrolyte material of an inorganic oxide, which forms a three-dimensional network between particles of an electrode active material. Thus, the inventors have selected the combination of the phosphate compounds containing a common polyanion as the combination of the electrode active material and the solid electrolyte suitable for smoothly transferring the Li ions, and have produced an all-solid-state cell having electrodes containing the solid electrolyte between the electrode active material particles. However, because the solid electrolyte was fired in the state of a mixture with the electrode active material in the electrode layer, the electrolyte was reacted with the active material, so that reduction in the peak intensity of the active material and formation of a heterophase were found in an XRD (X-ray diffraction) observation. The active material in this state was subjected to a charge-discharge ability measurement using an ideal system containing an electrolytic solution. As a result, the charge-discharge capacity of the active material was extremely reduced, and the active material was incapable of charge and discharge at its original theoretical capacity. Thus, the capacity of the electrode active material was lowered.

Then, the inventors have lowered the firing temperature to prevent the reaction between the electrode active material and the solid electrolyte. However, the solid electrolyte particles were not sufficiently sintered, the particle boundary resistance between the solid electrolyte particles was increased, and the connection interface area between the electrode active material and the solid electrolyte was not increased. As a result, both the particle boundary resistance of the solid electrolyte and the interface reaction resistance of the electrode active material and the solid electrolyte could not be lowered, whereby the resultant all-solid-state cell had no charge-discharge capacity (no charge-discharge ability).

SUMMARY OF THE INVENTION

In view of the above problems, an object of the present invention is to provide such an all-solid-state cell that the particle boundary resistance of a solid electrolyte can be lowered in an electrode layer while preventing capacity reduction due to a reaction of the solid electrolyte with an electrode active material, a network of the solid electrolyte can be formed in the electrode layer, the connection interface area between the solid electrolyte and the electrode active material can be remarkably increased to lower the interface reaction resistance, and thus charge and discharge can be carried out even in the all solid state.

In research of an all-solid-state cell having an electrode layer composed of a mixture of a solid electrolyte material and an electrode active material, the inventors have found that the charge-discharge capacity of the electrode active material is reduced below its original theoretical capacity due to reduction in the crystallinity of the electrode active material and formation of a heterophase by a reaction between the solid electrolyte material and the electrode active material. Based on this finding, the inventors have further found that when a combination of the materials satisfies the inequality Ty>Tz (in which Ty is a temperature at which the capacity of the electrode active material is lowered by the reaction, and Tz is an initiation temperature at which the solid electrolyte material is shrunk by firing), an electrolyte network can be formed in the electrode layer to lower the resistance within the temperature range of Tz to Ty, the connection area between the materials can be increased while preventing the reaction between the electrolyte material and the electrode active material, and the interface reaction resistance at the connection interface between the materials can be lowered, whereby the resultant all-solid-state cell has a low internal resistance.

In the present invention, a combination of phosphate compounds containing a common polyanion may be selected as the combination of an electrode active material and a solid electrolyte material suitable for smoothly transferring Li ions, and the solid electrolyte material comprising the phosphate compound may be vitrified. In a specific example, a Nasicon type LAGP having a relatively higher ion conductivity among the phosphate compounds was vitrified, and the resultant solid electrolyte material had low transition temperatures, Tg (glass transition point) of approximately 480° C. and Tx (crystallization temperature) of approximately 590° C. (see FIG. 10). This glass material had a firing shrinkage initiation temperature of 550° C. to 600° C. Then, the reactivity between this vitrified solid electrolyte material and the electrode active material was evaluated, and crystallinity reduction and heterophase formation were not observed even at a temperature sufficiently higher than the firing shrinkage initiation temperature. Thus, the novel combination of the phosphate compound materials containing a common polyanion satisfied the relation of Ty>Tz.

As a result, the inventors found a condition for preventing the deterioration in the charge-discharge ability of the electrode active material due to the reaction between the electrode active material and the solid electrolyte material while maintaining sufficient connection of the solid electrolyte particles. The above problems were solved based on this finding.

By using such materials for forming the mixture electrode layer of the all-solid-state cell, the particle boundary resistance between the solid electrolyte particles could be lowered while preventing the reduction in the capacity of the electrode active material, and the electrolyte network could be formed in the electrode layer. Therefore, the connection interface area between the electrode active material and the solid electrolyte material could be remarkably increased to lower the interface reaction resistance, and thus the resultant all-solid-state cell was capable of charge and discharge operations even in the all solid state.

Thus, an all-solid-state cell according to the present invention comprises positive and negative electrode portions containing an electrode active material, an electrolyte portion containing a solid electrolyte, and positive and negative collector portions, and is characterized in that the one or both of the positive and negative electrode portions are formed by mixing and firing the electrode active material and an amorphous solid electrolyte material, which satisfy the inequality:

$$Ty>Tz$$

wherein Ty is a temperature at which the capacity of the electrode active material is lowered by a reaction between the electrode active material and the solid electrolyte material, and Tz is a temperature at which the solid electrolyte material is shrunk by firing.

Specifically, Tz is a temperature at which the relative density of the solid electrolyte material is increased to 70% or more of the theoretical density thereof due to the firing shrinkage. Tz is preferably a temperature at which the relative density of the material is increased to 80% or more due to the firing shrinkage within the temperature range of Ty>Tz.

Specifically, Ty is a temperature at which the charge-discharge capacity of the electrode active material is lowered below 50% of the original theoretical capacity thereof. Ty is preferably a temperature at which the charge-discharge capacity of the electrode active material is 80% or more of the theoretical capacity within the temperature range of Ty>Tz.

In the present invention, the solid electrolyte material may comprise an amorphous polyanion compound, and the one or both of the positive and negative electrode portions may be formed by mixing and firing the electrode active material and the solid electrolyte material. Alternatively, the solid electrolyte material may comprise an amorphous phosphate compound, and the one or both of the positive and negative electrode portions may be formed by mixing and firing the electrode active material and the solid electrolyte material.

In the present invention, the solid electrolyte material comprising the phosphate compound may be of Nasicon type after the firing. In this case, the phosphate compound of the solid electrolyte material may be LAGP $Li_{1+x}Al_xGe_{2-x}(PO_4)_3$ or LATP $Li_{1+x}Al_xTi_{2-x}(PO_4)_3$ ($0 \leq x \leq 1$).

In the present invention, the electrode active material may be a Nasicon type material comprising a phosphate compound. In this case, the phosphate compound of the electrode active material may be LVP $Li_mV_2(PO_4)_3$ ($1 \leq m \leq 5$).

In the present invention, the electrode active material for the positive electrode portion may be an olivine type positive electrode active material comprising a phosphate compound. In this case, the phosphate compound of the positive electrode active material may be LNP $Li_nNiPO_4$, LCP $Li_nCoPO_4$, LMP $Li_nMnPO_4$ or LFP $Li_nFePO_4$ ($0 \le n \le 1$).

In the present invention, the solid electrolyte material and the electrode active material may be of Nasicon type after the firing.

In the present invention, the all-solid-state cell may have such a symmetrical structure that the solid electrolyte material and the electrode active material are of Nasicon type, the solid electrolyte material comprises LAGP $Li_{1+x}Al_xGe_{2-x}(PO_4)_3$ ($0 \le x \le 1$, preferably $0.3 \le x \le 0.7$), and the electrode active material comprises LVP $Li_mV_2(PO_4)_3$ ($1 \le m \le 5$) in both the positive and negative electrode portions.

In the present invention, the one or both of the positive and negative electrode portions may be formed by firing under an applied pressure. In this case, by the firing under an applied pressure, a dense microstructure can be formed in the one or both of the positive and negative electrode portion, the interface area between the electrode active material and the solid electrolyte material can be increased, and the interface charge transfer resistance can be lowered.

In the present invention, one or both of the positive and negative electrode portions may be formed from a paste for printing by firing it under an inert atmosphere. In this case, a binder component can be carbonized to ensure the electron conductivity of the electrode portion. Thus, the electron conductivity of the electrode portion can be maintained without intentional addition of a carbon component useful as an electron conducting aid.

As described above, in the all-solid-state cell of the present invention, the particle boundary resistance between the solid electrolyte particles can be lowered while preventing the reduction in the capacity of the electrode active material in the electrode layer.

Furthermore, in the present invention, since the electrolyte network can be formed in the electrode layer, the connection interface area between the electrode active material and the solid electrolyte material can be remarkably increased, the interface reaction resistance can be lowered, and thus the resultant all-solid-state cell is capable of charge and discharge operations even in the all solid state.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

An embodiment of the all-solid-state cell of the present invention will be described below with reference to FIGS. 1 to 26.

Figure 1:
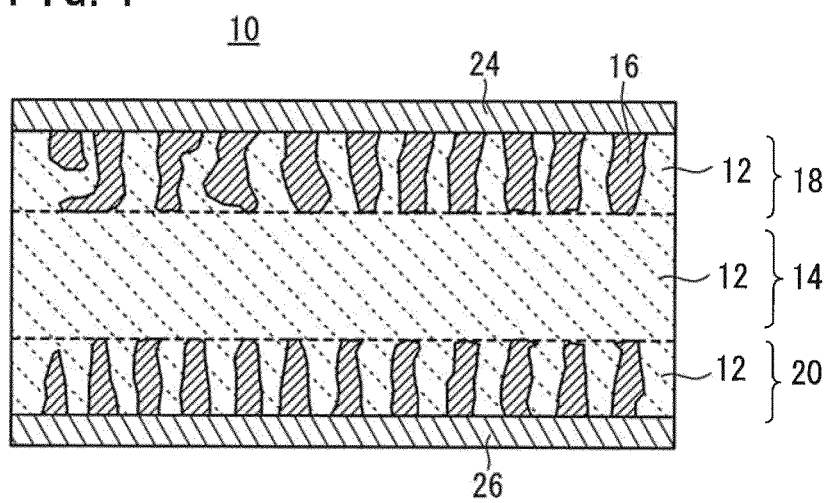
FIG. 1 is a schematic cross-sectional view showing a structure of an all-solid-state cell according to an embodiment of the present invention.

As shown in FIG. 1, an all-solid-state cell 10 according to this embodiment comprises a combination of an electrode active material and a solid electrolyte material. The all-solid-state cell 10 has a fired solid electrolyte plate 14 of a ceramic containing a solid electrolyte 12, a first electrode layer 18 (e.g. a positive electrode) integrally formed on one surface of the fired solid electrolyte plate 14 by mixing and firing an electrode active material 16 and a solid electrolyte 12, a second electrode layer 20 (e.g. a negative electrode) integrally formed on the other surface of the fired solid electrolyte plate 14 by mixing and firing an electrode active material 16 and a solid electrolyte 12, a first collector electrode 24 electrically connected to the first electrode layer 18, and a second collector electrode 26 electrically connected to the second electrode layer 20.

In the all-solid-state cell 10, the fired solid electrolyte plate 14 substantially acts as a solid electrolyte portion separating the positive and negative electrodes. The solid electrolyte 12 contained in the ceramic of the fired solid electrolyte plate 14 is not particularly limited, and may be selected from known conventional solid electrolytes. The solid electrolyte 12 preferably contains a lithium ion as a movable ion, and examples thereof include lithium ion-conductive solid glass electrolytes such as $Li_3PO_4$, LiPON ($Li_3PO_4$ mixed with nitrogen), $Li_2S$—$SiS_2$, $Li_2S$—$P_2S_5$, and $Li_2S$—$B_2S_2$, and lithium ion-conductive solid electrolytes prepared by doping the glass with a lithium halide (e.g. LiI) or a lithium oxoate (e.g. $Li_3PO_4$). The solid electrolyte 12 is particularly preferably a titanium oxide type solid electrolyte containing lithium, titanium, and oxygen, such as $Li_xLa_yTiO_3$ (0≤x≤1, 0≤y≤1), or a Nasicon type phosphate compound such as $Li_{1+x}Al_xGe_{2-x}(PO_4)_3$ or $Li_{1+x}Al_xTi_{2-x}(PO_4)_3$ (0≤x≤1), which can exhibit a stable performance even in the case of firing under an oxygen atmosphere.

The thickness of the fired solid electrolyte plate 14 is not particularly limited, and is preferably 5 μm to 1 mm, more preferably 5 μm to 100 μm.

In the first electrode layer 18 and the second electrode layer 20, a large number of powder particles of the solid electrolyte 12 are bonded by sintering to form a porous body. In the porous body, a plurality of pores are three-dimensionally connected from the surface to the inside, and are filled with the electrode active material 16. Such a porous body, formed by bonding the powder particles of the solid electrolyte 12 by the sintering, is also referred to as an electrolyte network.

The thicknesses of the first electrode layer 18 and the second electrode layer 20 are not particularly limited, and are preferably 5 μm to 1 mm, more preferably 5 μm to 500 μm.

In the formation of the first electrode layer 18 and the second electrode layer 20, a first paste for forming the first electrode layer 18 and a second paste for forming the second electrode layer 20 may be printed into electrode patterns on the fired solid electrolyte plate 14 respectively using a screen printing method, etc.

The first and second pastes may be produced by the steps of dissolving a binder in an organic solvent to prepare a solution, adding an appropriate amount of the solution to powders of the electrode active material and the solid electrolyte material to be hereinafter described, and kneading the resultant mixture.

Then, the electrode patterns of the first and second pastes printed on the fired solid electrolyte plate 14 may be fired at a temperature lower than a temperature for forming the fired solid electrolyte plate 14, to form the first electrode layer 18 and the second electrode layer 20. The obtained first electrode layer 18 and second electrode layer 20 are the porous bodies having a large number of pores filled with the electrode active material 16.

Figure 2:
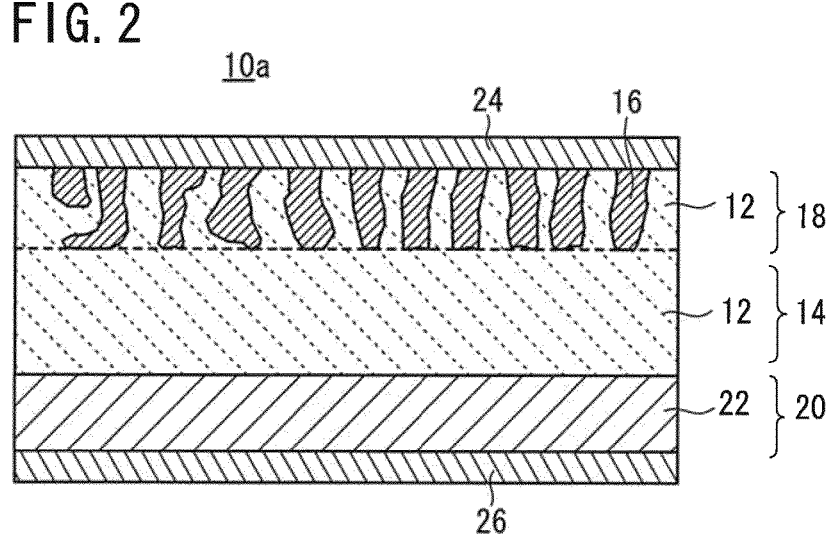
FIG. 2 is a schematic cross-sectional view showing a structure of an all-solid-state cell according to a modification example of the embodiment.

Though both the first electrode layer 18 and the second electrode layer 20 formed on the fired solid electrolyte plate 14 are composed of a ceramic containing a mixture of the electrode active material 16 and the solid electrolyte 12 in the above example, the second electrode layer 20 may be composed of a metal film 22 of a Li metal or Li alloy, like an all-solid-state cell 10a according to another example shown in FIG. 2.

In this embodiment, the solid electrolyte material added to the first electrode layer 18 and the second electrode layer 20 may comprise an amorphous polyanion compound, and the layers may be formed by firing the compound.

In this embodiment, the solid electrolyte material added to the first electrode layer 18 and the second electrode layer 20 may comprise an amorphous phosphate compound, and the layers may be formed by firing the compound.

The solid electrolyte material comprising the phosphate compound may be of Nasicon type after the firing, and the phosphate compound is particularly preferably LAGP $Li_{1+x}Al_xGe_{2-x}(PO_4)_3$ or LATP $Li_{1+x}Al_xTi_{2-x}(PO_4)_3$ (0≤x≤1).

The electrode active material may be a Nasicon type material comprising a phosphate compound, and the phosphate compound is particularly preferably LVP $Li_mV_2(PO_4)_3$ (1≤m≤5).

The positive electrode active material may be an olivine type material comprising a phosphate compound, and the phosphate compound is particularly preferably LNP $Li_nNiPO_4$, LCP $Li_nCoPO_4$, LMP $Li_nMnPO_4$ or LFP $Li_nFePO_4$ (0≤n≤1).

In this embodiment, the solid electrolyte material and the electrode active material comprising the phosphate compounds may be of Nasicon type after the firing. In this case, it is preferred that the solid electrolyte material comprises LAGP $Li_{1+x}Al_xGe_{2-x}(PO_4)_3$ ($0 \leq x \leq 1$, preferably $0.3 \leq x \leq 0.7$), and both the positive and negative electrode active materials comprise LVP $Li_mV_2(PO_4)_3$ ($1 \leq m \leq 5$), whereby the all-solid-state cell has a symmetrical structure.

Thus, in this embodiment, in the first electrode layer 18 and the second electrode layer 20 of the all-solid-state cell 10, the particle boundary resistance between the solid electrolyte particles can be lowered while preventing formation of a heterophase due to a reaction between the solid electrolyte material and the electrode active material 16.

Furthermore, in this embodiment, the electrolyte network can be formed in the first electrode layer 18 and the second electrode layer 20, whereby the connection interface area between the electrode active material 16 and the solid electrolyte 12 can be remarkably increased to lower the interface reaction resistance, and thus the resultant all-solid-state cell 10 is capable of charge and discharge operations even in the all solid state.

The first electrode layer 18 and the second electrode layer 20 are preferably formed by firing under an applied pressure. In this case, by the firing under an applied pressure, a dense microstructure can be formed in the electrode portion, the interface area between the electrode active material and the solid electrolyte material can be increased, and the interface charge transfer resistance can be lowered.

The methods for firing the layers under an applied pressure include a Hot Isostatic Pressing HIP, in which a mixture is heated at a high temperature while pressure is simultaneously and isotropically applied to the mixture, and a Hot Pressing, in which a mixture housed in a firing jig is heat-treated as a whole while pressure is uniaxially applied to the mixture. When using the HIP, a gas such as argon can be used as a pressure medium to apply isotropic pressure to the mixture.

The first electrode layer 18 and/or the second electrode layer 20 may be formed from a paste for printing by firing it under an inert atmosphere such as an Ar atmosphere. In this case, a binder component can be carbonized to ensure the electron conductivity of the first electrode layer 18 and/or the second electrode layer 20. Thus, the electron conductivity of the first electrode layer 18 and/or the second electrode layer 20 can be maintained without intentional addition of a carbon component useful as an electron conducting aid.

Examples of the all-solid-state cell 10 according to the embodiment will be described in detail below.

In Examples, the following Nasicon type phosphate compounds were used as a solid electrolyte material and an electrode active material.
Solid electrolyte material: LAGP $Li_{1.5}Al_{0.5}Ge_{1.5}(PO_4)_3$
Electrode active material: LVP $Li_3V_2(PO_4)_3$
[Preparation of Crystal Powder]
First, powders of $Li_2CO_3$, $GeO_2$, $Al_2O_3$, and $NH_4H_2(PO_4)_3$ were mixed at the stoichiometric composition ratio and fired at 900° C. in the air, so that a crystal powder of the solid electrolyte material $Li_{1.5}Al_{0.5}Ge_{1.5}(PO_4)_3$ (LAGP) (hereinafter referred to as the LAGP crystal powder) was prepared by a solid-phase synthesis method.

Meanwhile, powders of $Li_2CO_3$, $V_2O_3$, and $NH_4H_2(PO_4)_3$ were mixed at the stoichiometric composition ratio and fired at 930° C. in an Ar flow, so that a crystal powder of the positive (negative) electrode active material $Li_3V_2(PO_4)_3$ (LVP) (hereinafter referred to as the LVP crystal powder) was prepared by a solid-phase synthesis method.

[Production of Fired Solid Electrolyte Body]
The above obtained LAGP crystal powder was press-formed using a mold into a compact powder pellet having a diameter of 16 mm and a thickness of approximately 1 mm. The pressure for the forming was 500 kg/cm². The pellet was fired at 840° C. in the air to obtain a fired solid electrolyte pellet of LAGP.
[Preparation of Glass Powder (Vitrification of LAGP Solid Electrolyte)]
The LAGP crystal powder obtained by the solid-phase method was put in a Pt crucible and placed in a furnace under an air atmosphere heated at 1200° C. for 1 hour. Then, the LAGP crystal powder was taken out and rapidly cooled by iced water, to obtain a vitrified LAGP. The vitrified LAGP was pulverized using a mortar, a ball mill, etc. to prepare a fine LAGP glass powder.
[Sintering Property Comparison of Solid Electrolytes]
A solid electrolyte pellet of the LAGP crystal powder (hereinafter referred to as the crystalline LAGP solid electrolyte) and a solid electrolyte pellet of the LAGP glass powder (hereinafter referred to as the vitrified LAGP solid electrolyte) were produced, and the sintered states of the pellets were compared at different firing temperatures under an Ar atmosphere. The results of SEM observation of fracture cross sections in the pellets are shown in FIGS. 3A and 3B to 9A and 9B, and shrinkage properties of the pellets due to the firing under the Ar atmosphere are shown in the graphs of FIGS. 11 and 12.

Figure 3A:
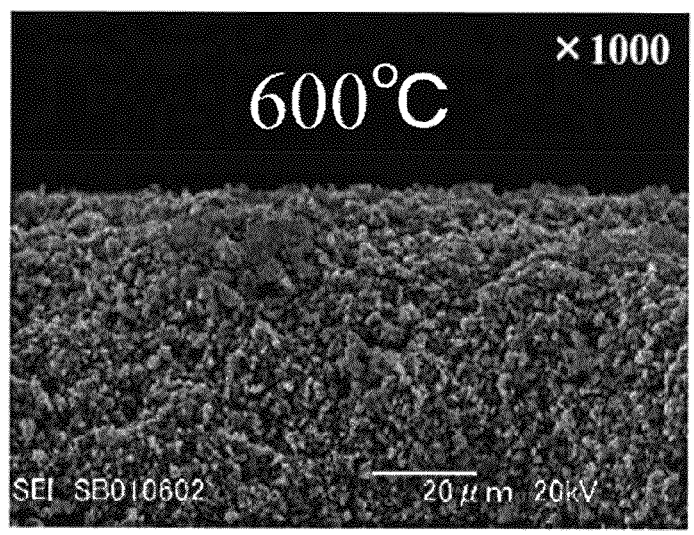
FIG. 3A is an SEM photograph at ×1000 magnification showing a cross section of a crystalline LAGP solid electrolyte sintered at a firing temperature (600° C.) under an Ar atmosphere.
Figure 3B:
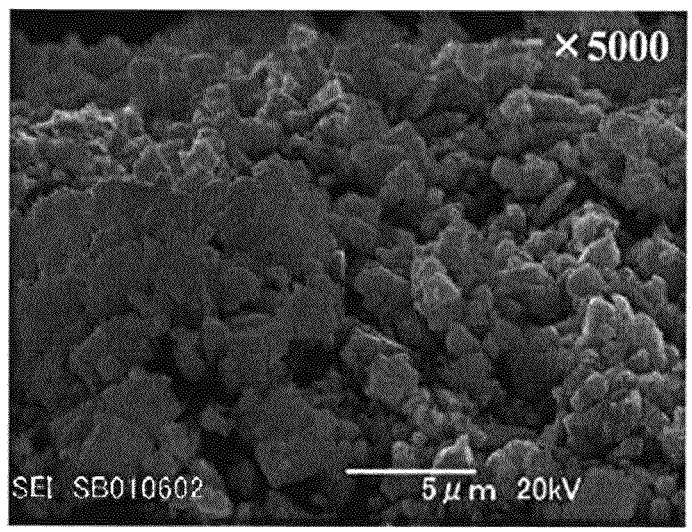
FIG. 3B is an SEM photograph at ×5000 magnification showing a cross section of a crystalline LAGP solid electrolyte sintered at a firing temperature (600° C.) under an Ar atmosphere.
Figure 4A:
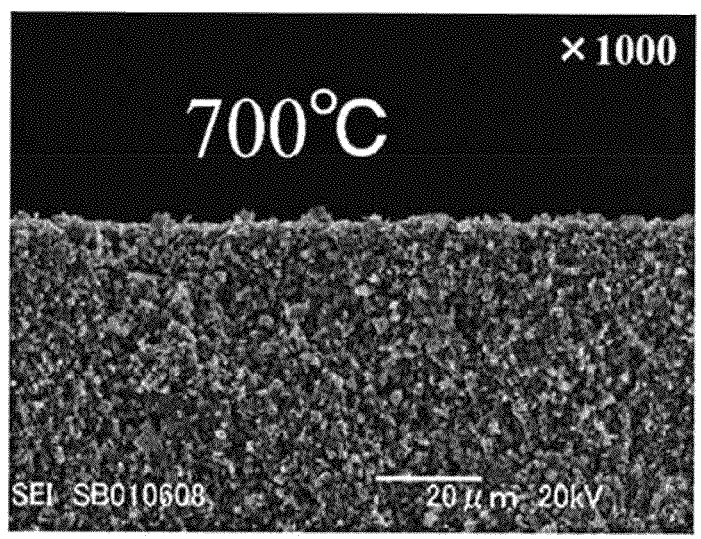
FIG. 4A is an SEM photograph at ×1000 magnification showing a cross section of the crystalline LAGP solid electrolyte sintered at a different firing temperature (700° C.) under the Ar atmosphere.
Figure 4B:
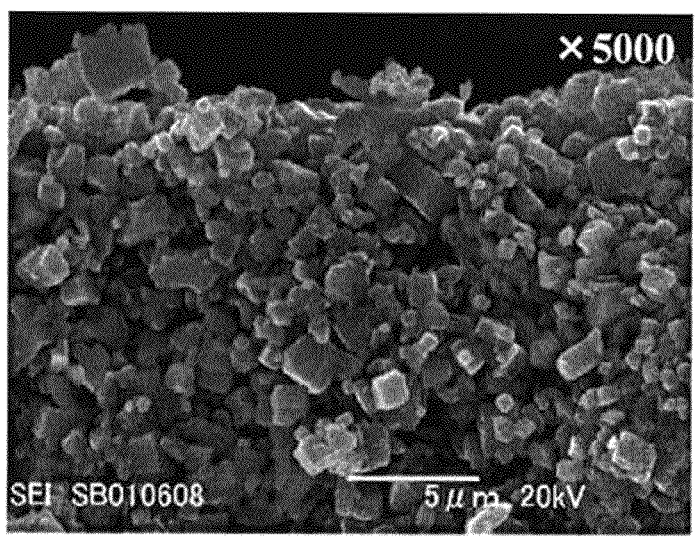
FIG. 4B is an SEM photograph at ×5000 magnification showing a cross section of the crystalline LAGP solid electrolyte sintered at a different firing temperature (700° C.) under the Ar atmosphere.
Figure 5A:
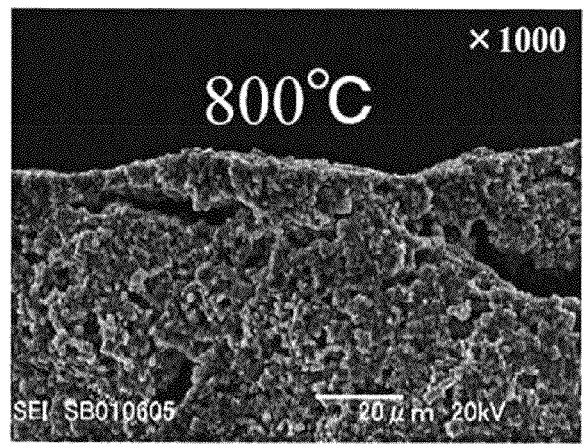
FIG. 5A is an SEM photograph at ×1000 magnification showing a cross section of the crystalline LAGP solid electrolyte sintered at a different firing temperature (800° C.) under the Ar atmosphere.
Figure 5B:
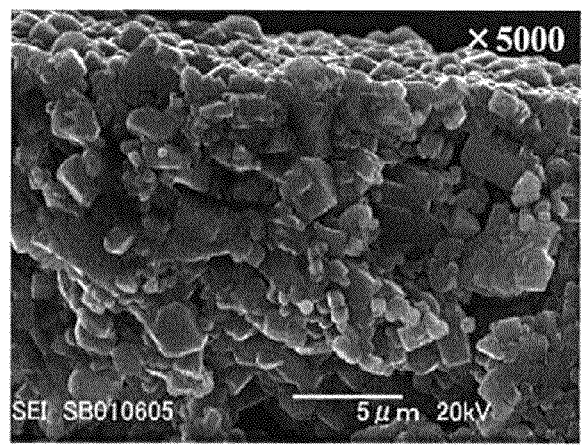
FIG. 5B is an SEM photograph at ×5000 magnification showing a cross section of the crystalline LAGP solid electrolyte sintered at a different firing temperature (800° C.) under the Ar atmosphere.
Figure 6A:
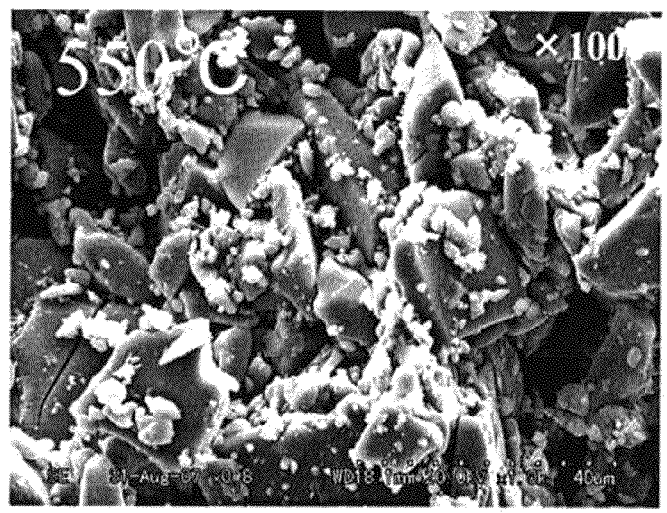
FIG. 6A is an SEM photograph at ×1000 magnification showing a cross section of a vitrified LAGP solid electrolyte sintered at a firing temperature (550° C.) under an Ar atmosphere.
Figure 6B:
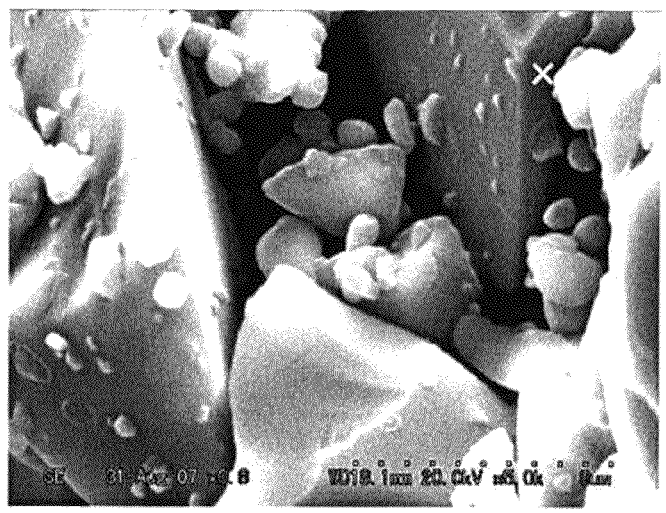
FIG. 6B is an SEM photograph at ×5000 magnification showing a cross section of a vitrified LAGP solid electrolyte sintered at a firing temperature (550° C.) under an Ar atmosphere.
Figure 7A:
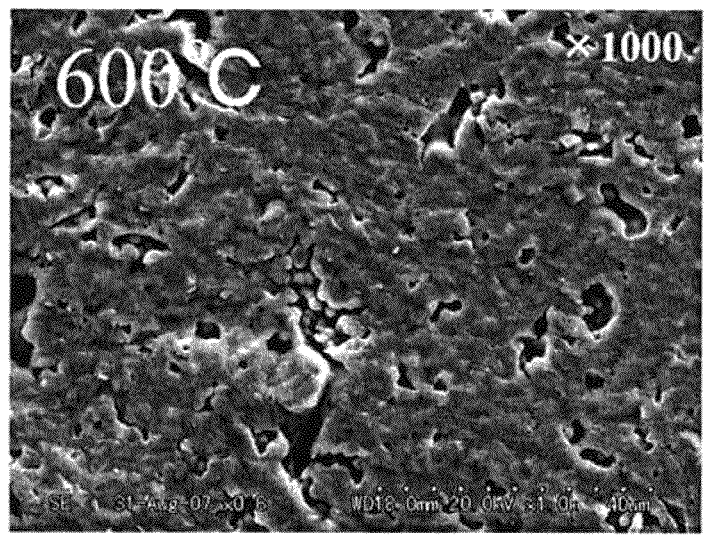
FIG. 7A is an SEM photograph at ×1000 magnification showing a cross section of the vitrified LAGP solid electrolyte sintered at a different firing temperature (600° C.) under the Ar atmosphere.
Figure 7B:
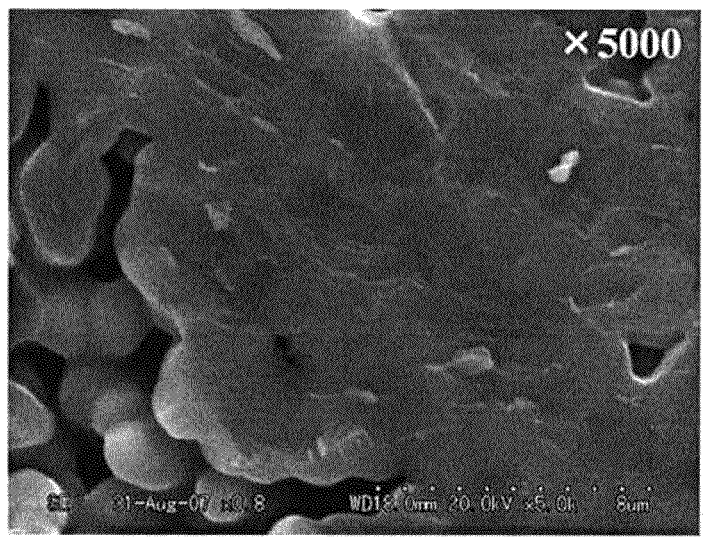
FIG. 7B is an SEM photograph at ×5000 magnification showing a cross section of the vitrified LAGP solid electrolyte sintered at a different firing temperature (600° C.) under the Ar atmosphere.
Figure 8A:
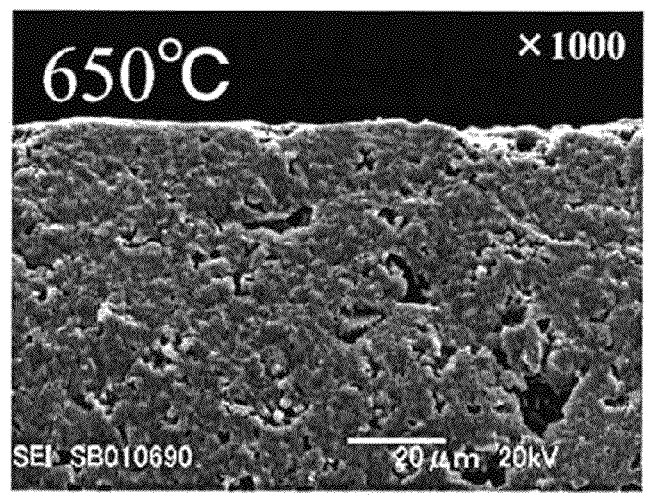
FIG. 8A is an SEM photograph at ×1000 magnification showing a cross section of the vitrified LAGP solid electrolyte sintered at a different firing temperature (650° C.) under the Ar atmosphere.
Figure 8B:
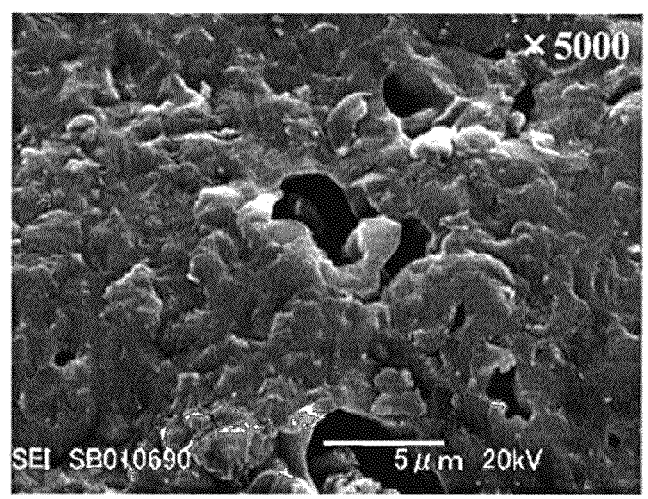
FIG. 8B is an SEM photograph at ×5000 magnification showing a cross section of the vitrified LAGP solid electrolyte sintered at a different firing temperature (650° C.) under the Ar atmosphere.
Figure 9A:
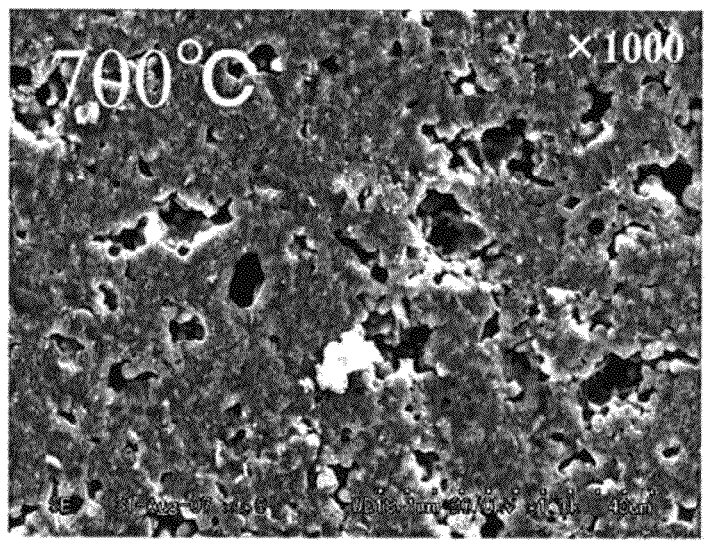
FIG. 9A is an SEM photograph at ×1000 magnification showing a cross section of the vitrified LAGP solid electrolyte sintered at a different firing temperature (700° C.) under the Ar atmosphere.
Figure 9B:
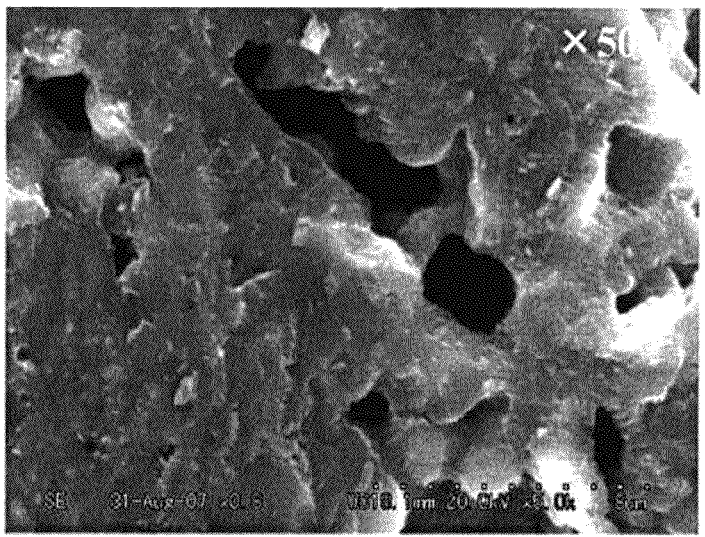
FIG. 9B is an SEM photograph at ×5000 magnification showing a cross section of the vitrified LAGP solid electrolyte sintered at a different firing temperature (700° C.) under the Ar atmosphere.

FIGS. 3A and 3B to 5A and 5B include SEM photographs showing cross sections of the crystalline LAGP solid electrolyte fired at 600° C., 700° C., and 800° C. Each of FIGS. 3A, 4A and 5A is an SEM photograph at ×1000 magnification, and each of FIGS. 3B, 4B and 5B is an SEM photograph at ×5000 magnification. FIGS. 6A and 6B to 9A and 9B include SEM photographs showing cross sections of the vitrified LAGP solid electrolyte fired at 550° C., 600° C., 650° C., and 700° C. Each of FIGS. 6A, 7A, 8A and 9A is an SEM photograph at ×1000 magnification, and each of FIGS. 6B, 7B, 8B and 9B is an SEM photograph at ×5000 magnification.

Figure 10:
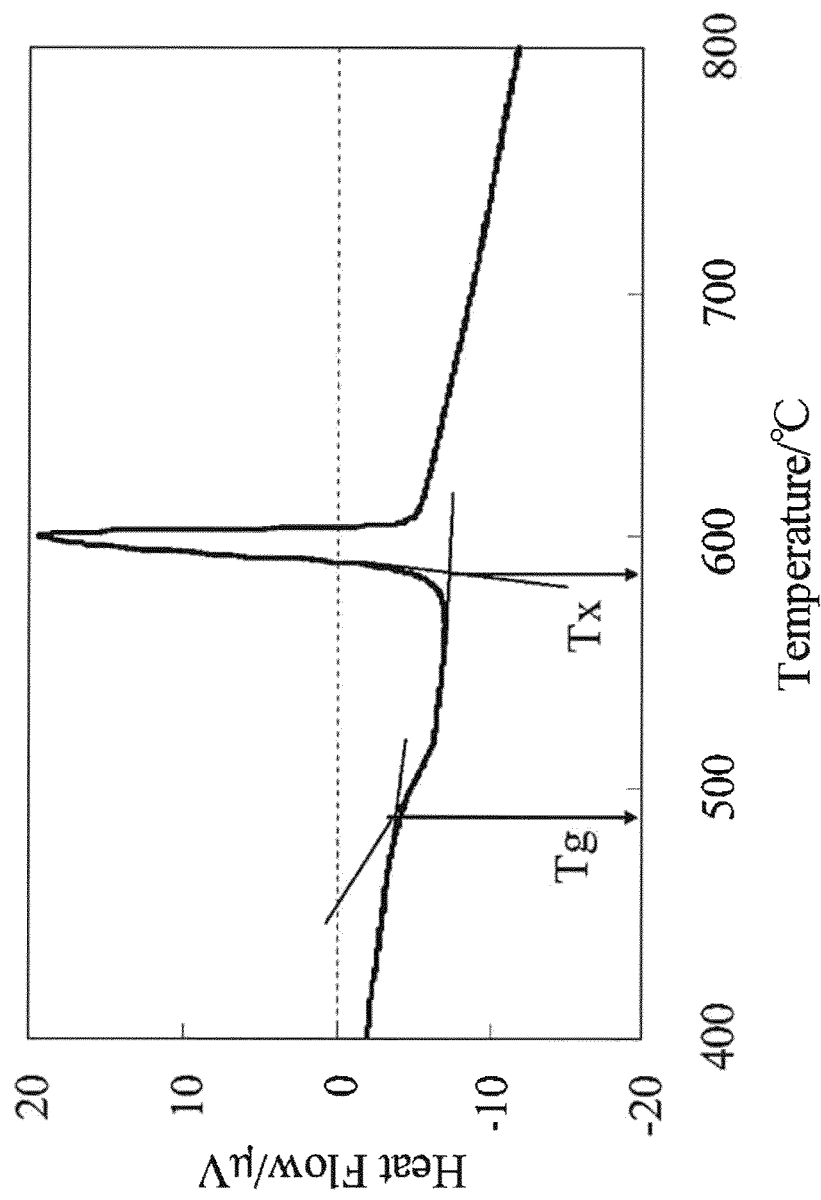
FIG. 10 is a graph showing a DTA (differential thermal analysis) property of the vitrified LAGP solid electrolyte.

FIG. 10 is a graph showing a DTA (differential thermal analysis) property of the vitrified LAGP solid electrolyte in an inert atmosphere ($N_2$ atmosphere). It is clear from FIG. 10 that the vitrified LAGP solid electrolyte had low transition temperatures, Tg (glass transition point) of approximately 480° C. and Tx (crystallization temperature) of approximately 590° C.

Figure 11:
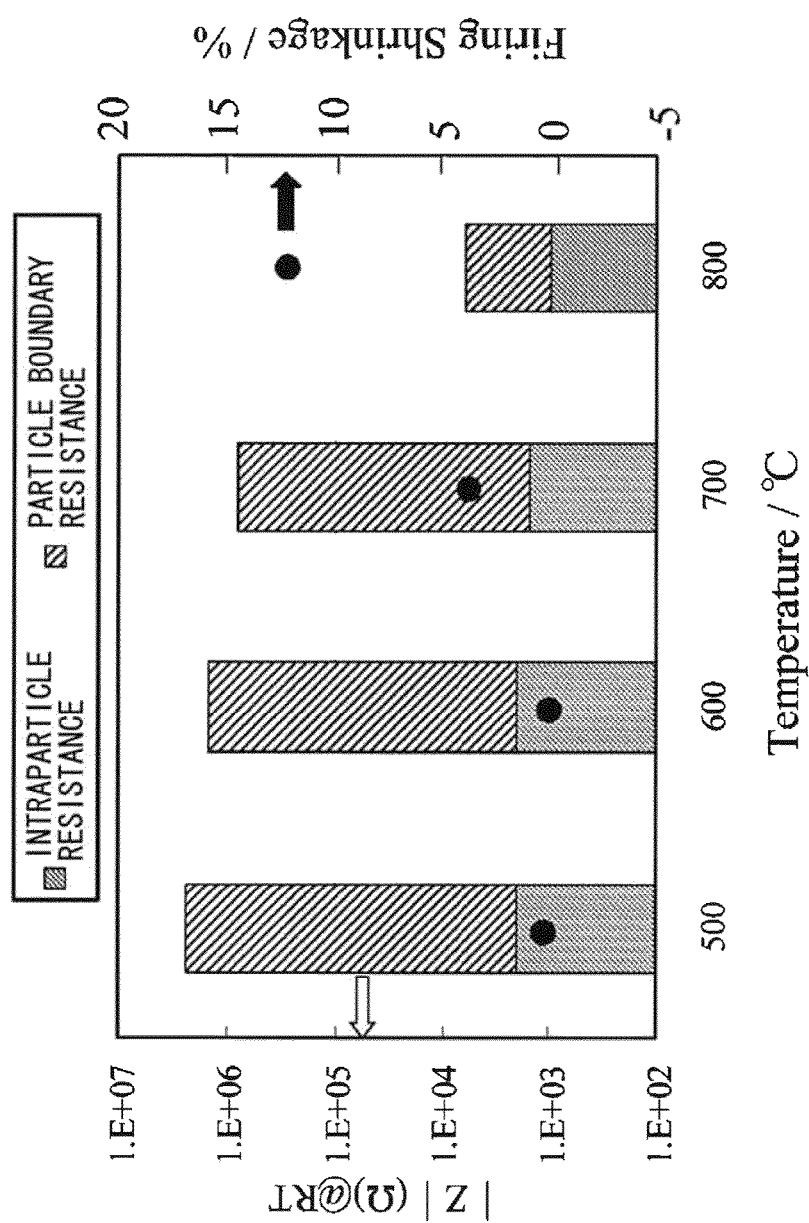
FIG. 11 is a characteristic diagram showing changes of the firing shrinkage and the internal impedance of the crystalline LAGP solid electrolyte depending on the firing temperature.
Figure 12:
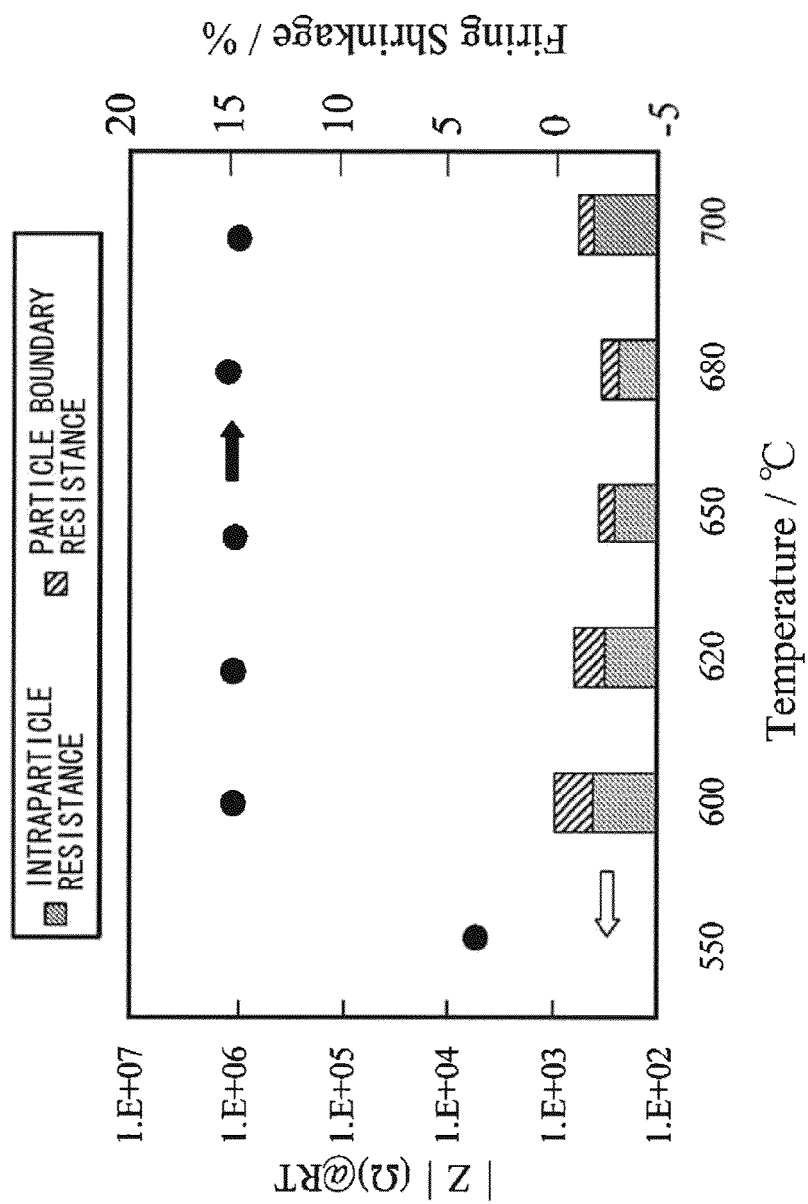
FIG. 12 is a characteristic diagram showing changes of the firing shrinkage and the internal impedance of the vitrified LAGP solid electrolyte depending on the firing temperature.

FIG. 11 is a characteristic diagram showing changes of the firing shrinkage (%) and the internal impedance of the crystalline LAGP solid electrolyte depending on the firing temperature. FIG. 12 is a characteristic diagram showing changes of the firing shrinkage (%) and the internal impedance of the vitrified LAGP solid electrolyte depending on the firing temperature. In the diagrams, the firing shrinkage of each LAGP solid electrolyte is shown by plotted black dots, and the internal impedance is divided into two corresponding to the intra-particle resistance and the particle boundary resistance and shown by bar graph.

As shown in FIGS. 3A and 3B to 5A and 5B, and 11, in the crystalline LAGP solid electrolyte, at a firing temperature of 700° C. or lower, the powder particles were not sufficiently sintered and maintained the original particle shapes, and the particle boundary resistance was remarkably high in terms of the internal impedance. On the other hand, as shown in FIGS. 6A and 6B to 9A and 9B, and 12, in the LAGP glass powder (the vitrified LAGP solid electrolyte), at a firing temperature of 600° C. or higher, the solid electrolyte material was sufficiently shrunk by the firing, the particles were suitably bonded to each other, and the particle boundary resistance was significantly lowered in terms of the internal impedance.

[Relation of Reactivity Between Electrolyte and Electrode Active Material to Charge-Discharge Capacity of Electrode Active Material]

Figure 13:
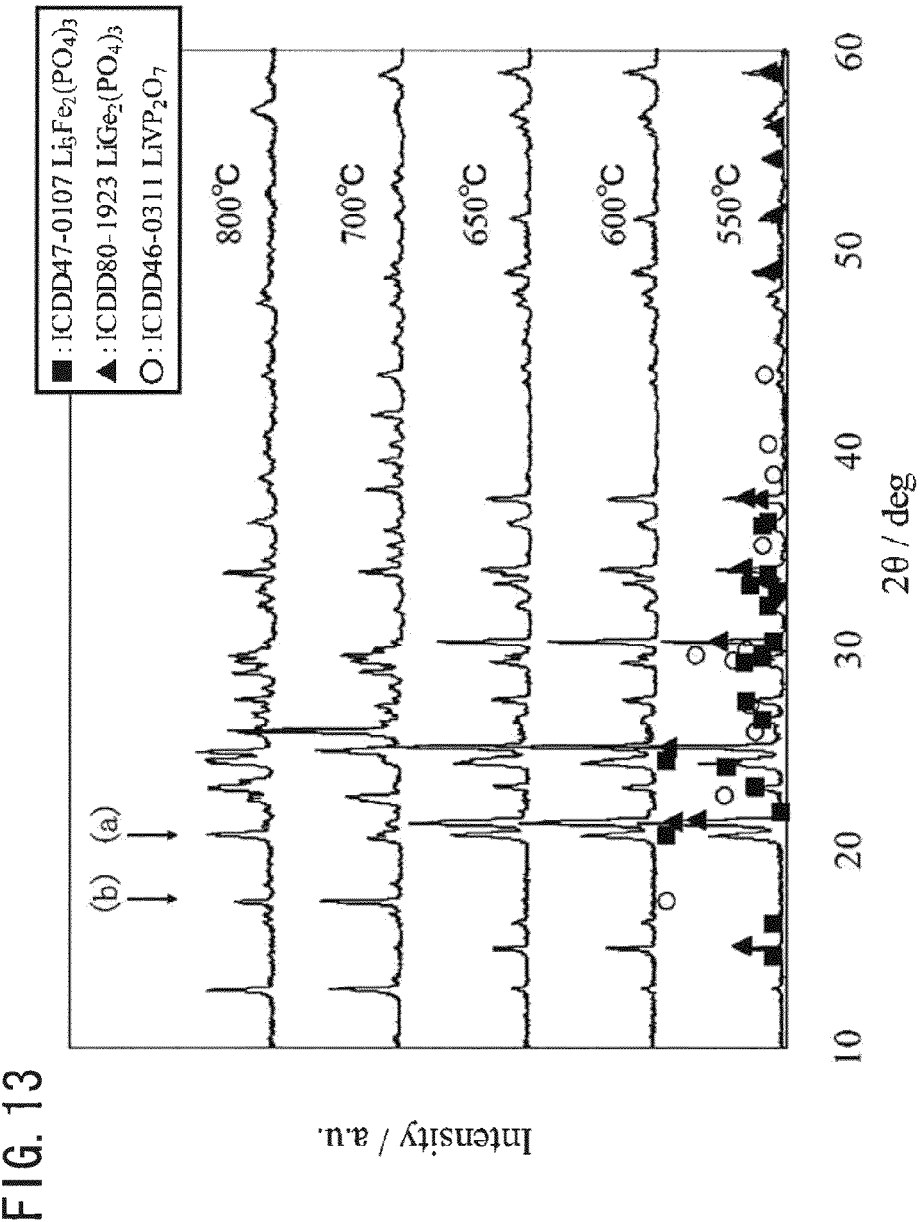
FIG. 13 is a diagram showing the XRD (X-ray diffraction) characteristics of a fired mixture pellet of an LAGP crystal powder and an LVP crystal powder.

An electron conducting aid of acetylene black was added to a mixture of the LAGP crystal powder and the LVP crystal powder to carry out an evaluation using an electrolytic solution later. A powder pellet of the mixture was prepared and fired at a firing temperature under an Ar atmosphere to obtain a fired body. The obtained fired body was subjected to an XRD (X-ray diffraction) measurement. The measurement results are shown in FIG. 13. In FIG. 13, peaks of $Li_2Fe_2(PO_4)_2$ for identifying the crystal structure of the LVP are marked with black squares, and peaks of $LiGe_2(PO_4)_3$ for identifying the crystal structure of the LAGP are marked with black triangles. The LAGP and the LVP are not registered in ICDD, and thus the compounds having the same crystal structures were used for the identification. As shown in the measurement results, a plurality of peaks of a heterophase derived from a condensed phosphate salt were observed in addition to the peaks of the LAGP and LVP at temperatures of 700° C. and 800° C., at which the LAGP crystal powder was sintered.

Figure 14:
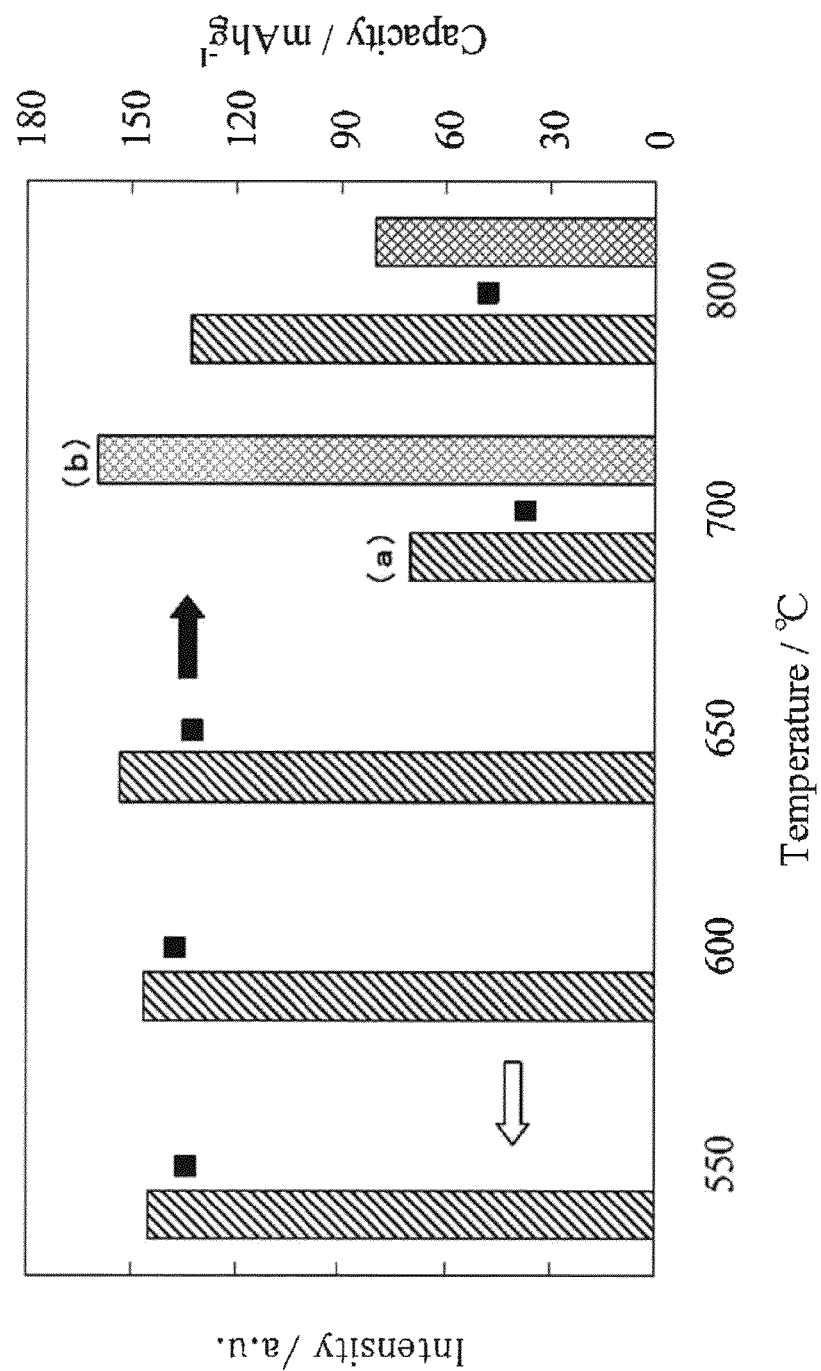
FIG. 14 is a characteristic diagram showing a peak intensity (peak height) relation between a main peak of the positive electrode active material (the fired mixture pellet of the LAGP crystal powder and the LVP crystal powder) and a main peak of $LiVP_2O_7$ identified as a heterophase peak, and the change in the discharge capacity of the positive electrode active material.

The relations between the charge-discharge capacity of the electrode active material, and the peak intensity of the positive electrode active material and the peak intensity of the heterophase were evaluated. Specifically, each of the fired mixed powder body pellets, fired at the different temperatures, was pulverized and used in a positive electrode in a liquid type lithium ion cell containing an electrolytic solution (1-mol/L $LiClO_4$/EC+DEC (volume ratio 1:1) solution) and a negative electrode of Li metal, and the charge-discharge ability (capacity) of the positive electrode active material was measured. It should be noted that the LVP has a theoretical charge-discharge capacity of about 130 mAh/g. The peak intensity (peak height) relation between the main peak (a) of the positive electrode active material observed in the XRD measurement (see FIG. 13) and the main peak (b) of $LiVP_2O_7$ identified as a heterophase peak, marked with a white circle in FIG. 13, is shown in FIG. 14 as the measurement results. In FIG. 14, the change of the charge-discharge capacity of the positive electrode active material is shown by plotted black squares. The peak intensities of the main peak (a) of the positive electrode active material and the main peak (b) of the heterophase are shown in the bar graph. As shown in the measurement results, the reduction in the peak intensity of the positive electrode active material and the generation of the heterophase derived from vanadium contained in the positive electrode active material corresponded to the reduction in the charge-discharge capacity of the positive electrode active material. Thus, the capacity reduction due to the reaction between the solid electrolyte material and the electrode active material in the high-temperature firing caused the reduction in the charge-discharge ability of the electrode active material. It is possible that the electrode active material was converted to $LiVP_2O_7$, which was identified beforehand. Further, the electrode active material exhibited a charge-discharge capacity significantly lower than the original theoretical capacity at temperatures of 700° C. and 800° C., at which the LAGP crystal powder was sintered.

Figure 15:
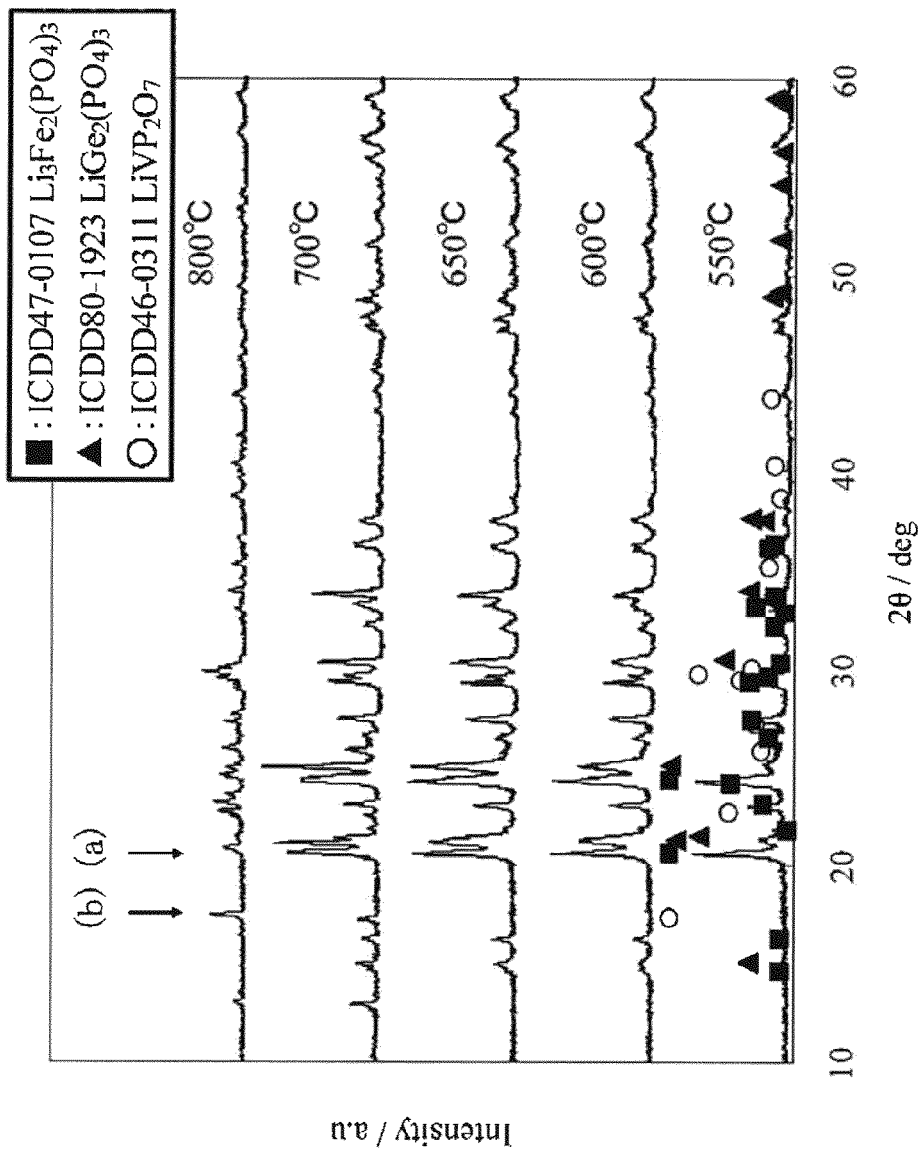
FIG. 15 is a diagram showing the XRD (X-ray diffraction) characteristics of a fired mixture pellet of an LAGP glass powder and an LVP crystal powder.
Figure 16:
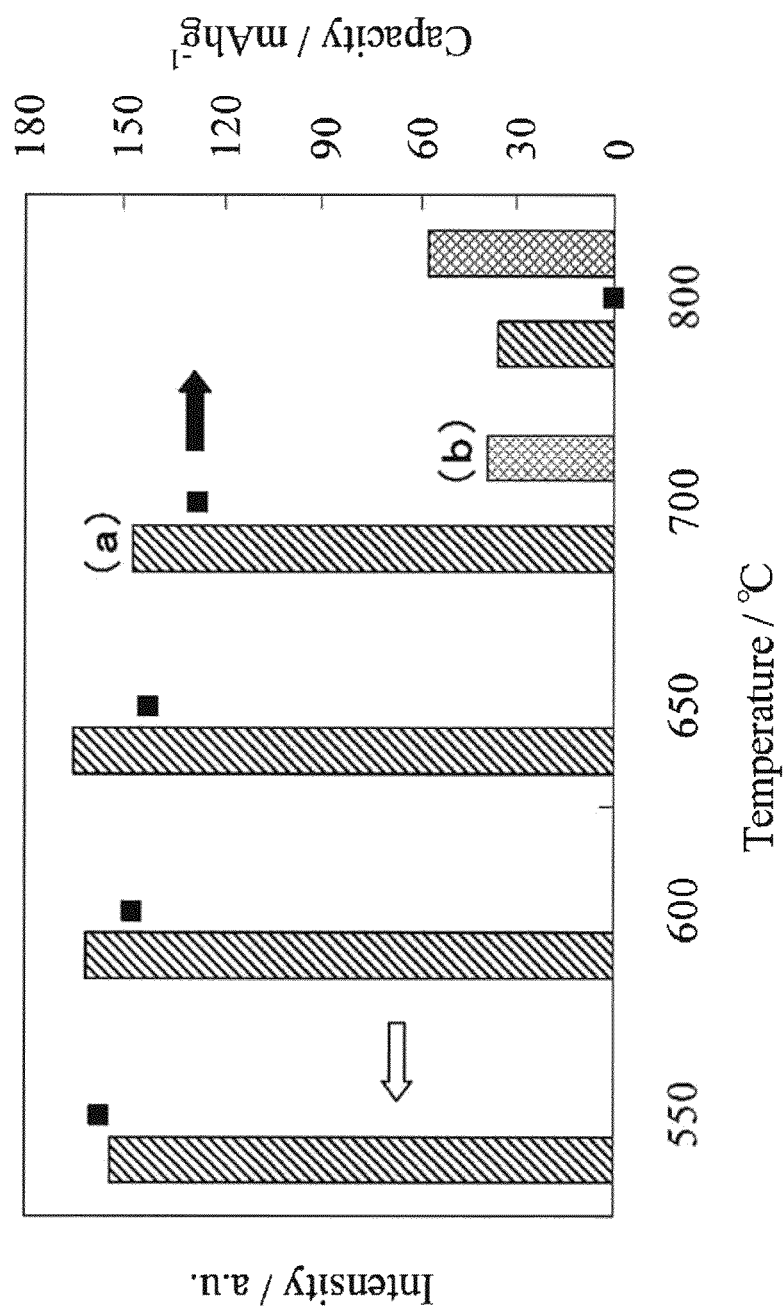
FIG. 16 is a characteristic diagram showing a peak intensity (peak height) relation between a main peak of the positive electrode active material (the fired mixture pellet of the LAGP glass powder and the LVP crystal powder) and a main peak of $LiVP_2O_7$ identified as a heterophase peak, and a change in the discharge capacity of the positive electrode active material.
Figure 17:
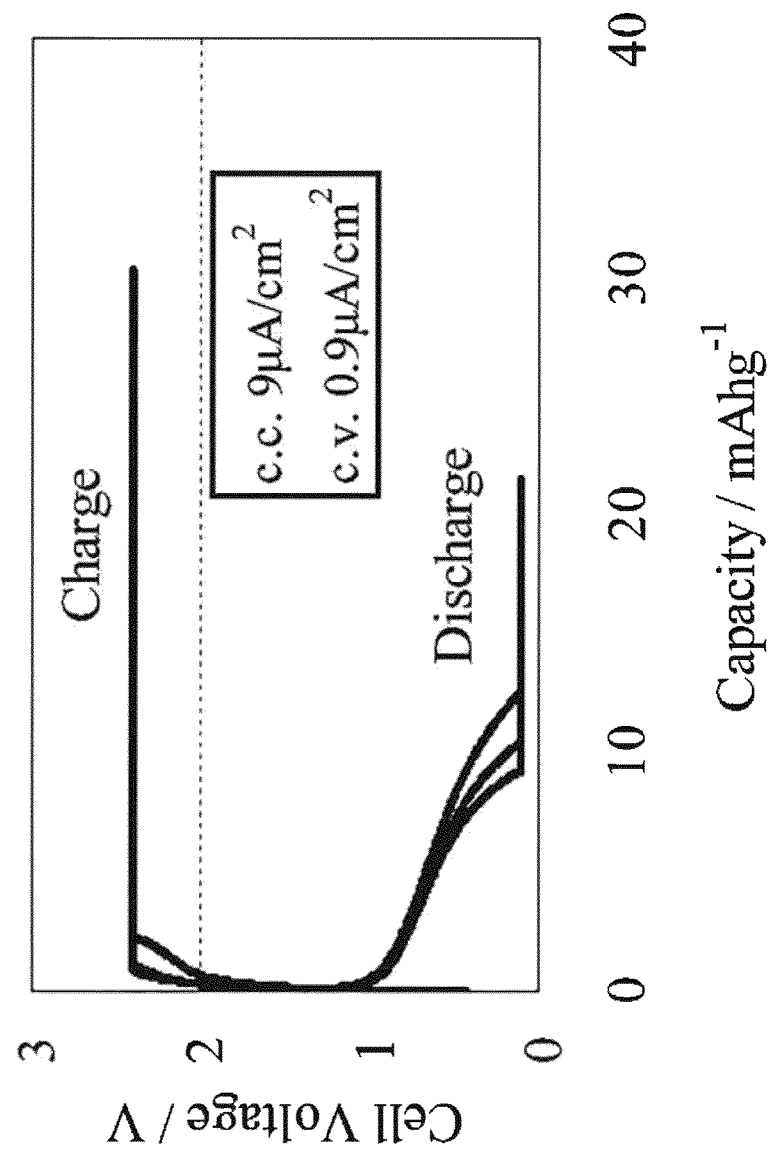
FIG. 17 is a graph showing the charge/discharge property of Example 1 using the LAGP glass powder.
Figure 18:
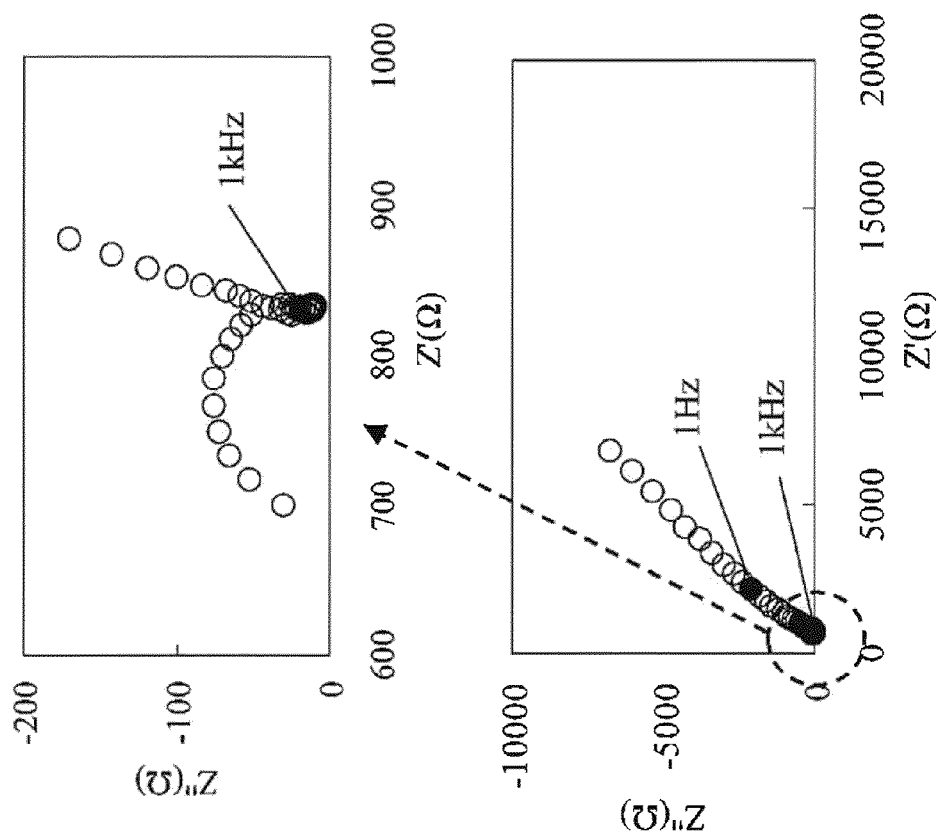
FIG. 18 is a graph showing the alternating-current impedance property of Example 1.
Figure 19:
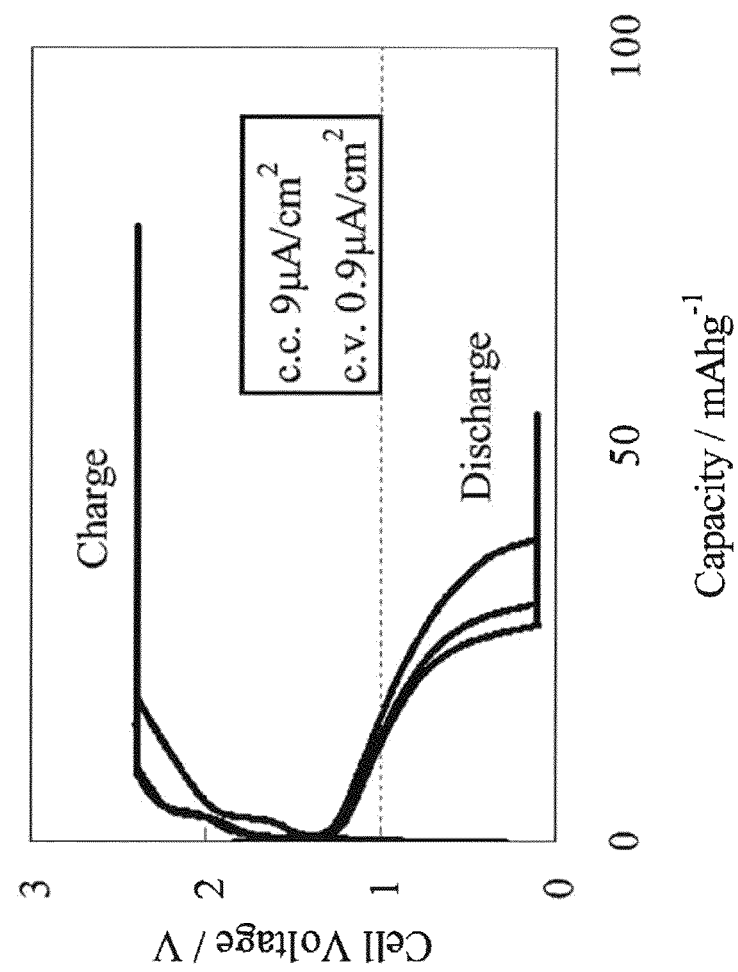
FIG. 19 is a graph showing the charge/discharge property of Example 2 using the LAGP glass powder.
Figure 20:
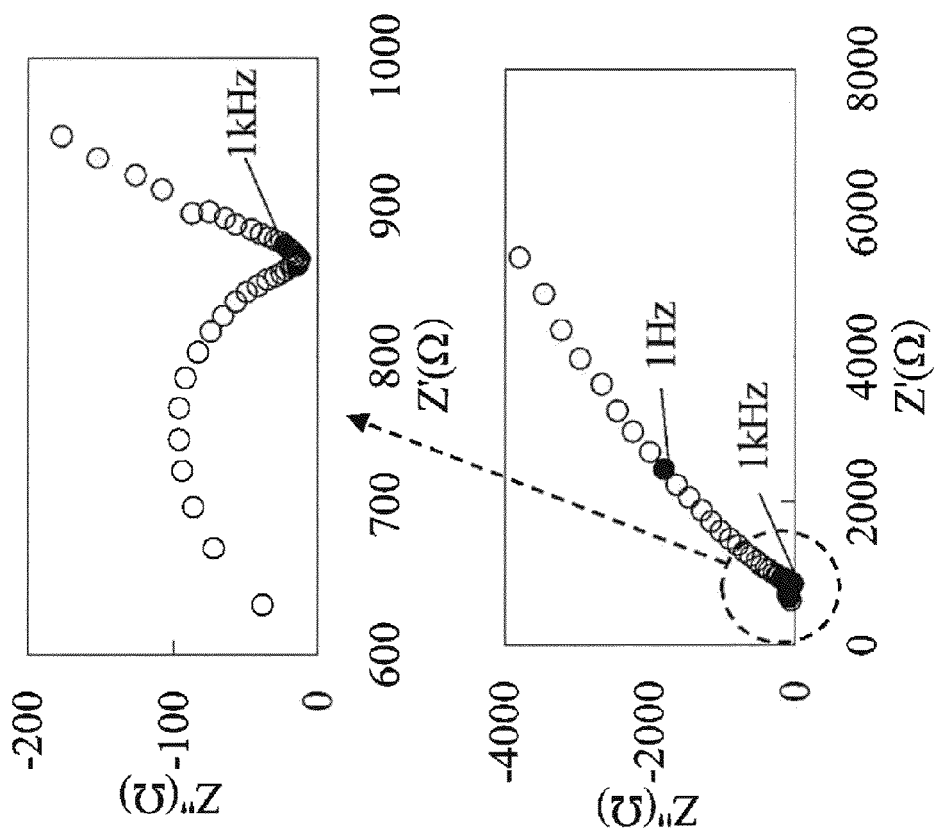
FIG. 20 is a graph showing the alternating-current impedance property of Example 2.
Figure 21:
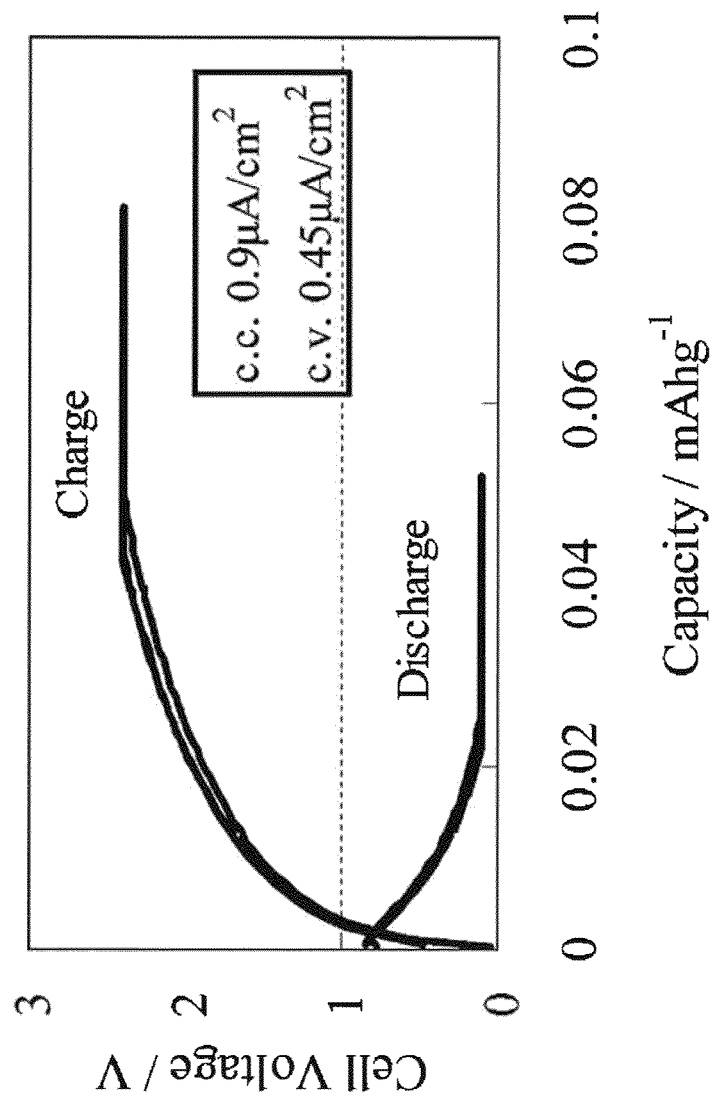
FIG. 21 is a graph showing the charge/discharge property of Comparative Example 1 using the LAGP crystal powder.
Figure 22:
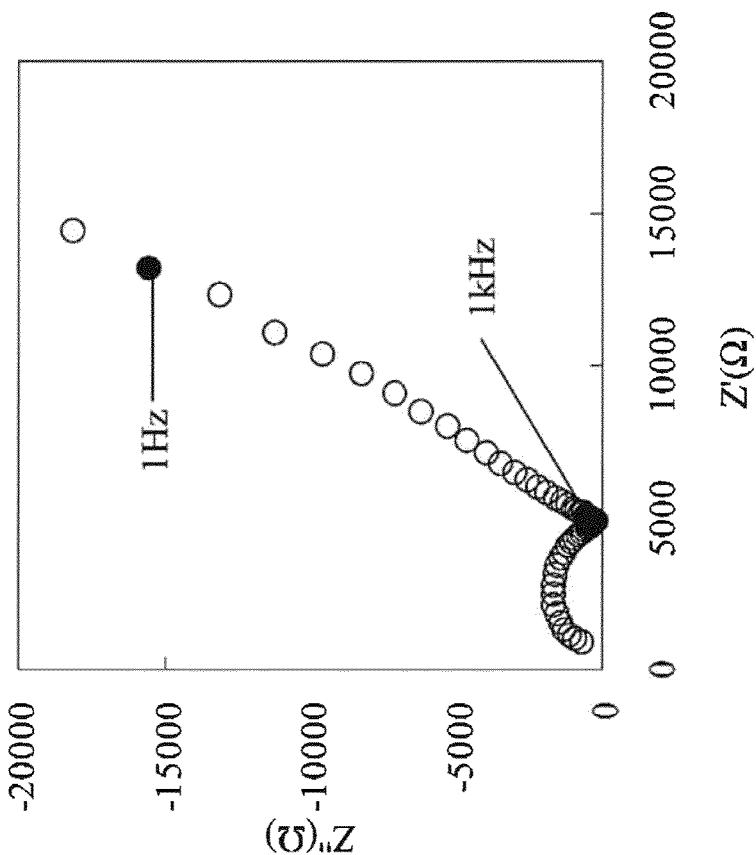
FIG. 22 is a graph showing the alternating-current impedance property of Comparative Example 1.
Figure 23:
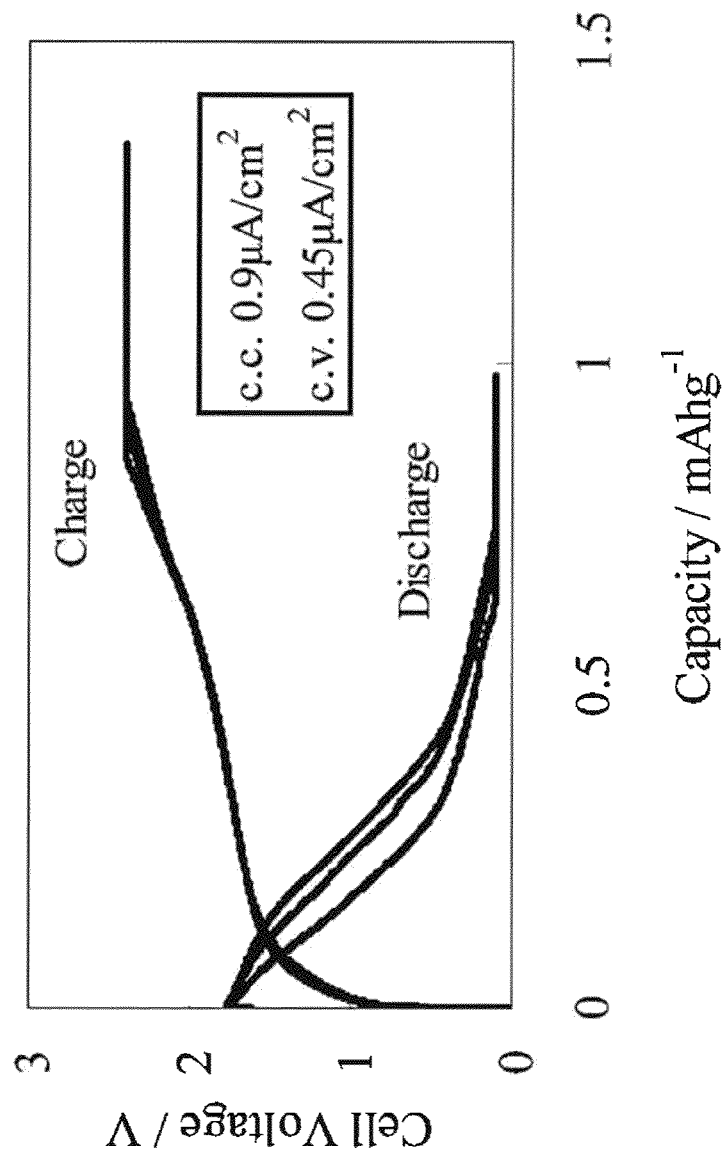
FIG. 23 is a graph showing the charge/discharge property of Comparative Example 2 using the LAGP crystal powder.
Figure 24:
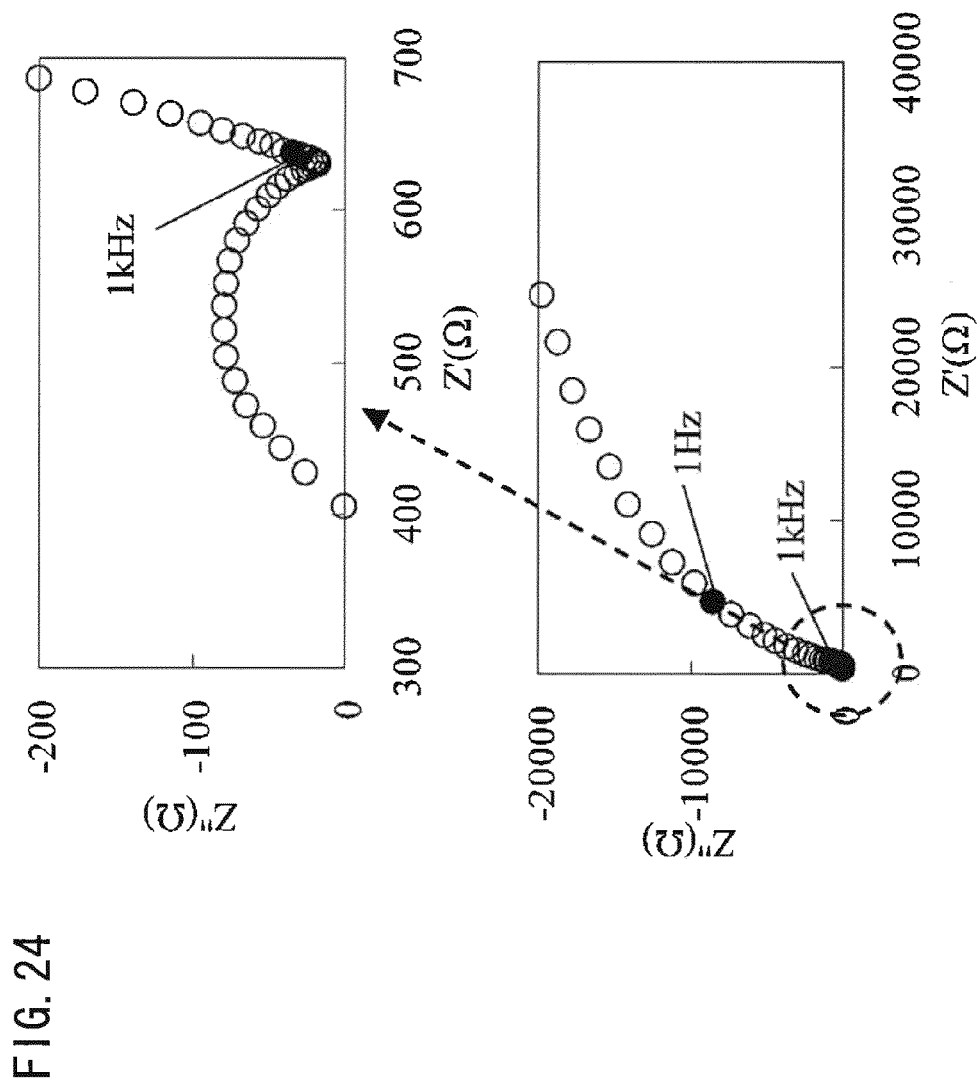
FIG. 24 is a graph showing the alternating-current impedance property of Comparative Example 2.

An electron conducting aid of acetylene black was added to a mixture of the LAGP glass powder and the LVP crystal powder to carry out an evaluation using an electrolytic solution later. A powder pellet of the mixture was prepared and fired at a firing temperature under an Ar atmosphere to obtain a fired body. The obtained fired body was subjected to an XRD measurement. Further, the fired body was used in a system containing the electrolytic solution, and the charge-discharge ability of the electrode active material was evaluated. The XRD measurement results are shown in FIG. 15, and the charge-discharge ability evaluation results are shown in FIG. 16. The plotted marks in FIGS. 15 and 16 have the same meanings as those in FIGS. 13 and 14.

As shown in FIG. 15, the particles of the LAGP glass powder were suitably bonded to each other around 600° C. Further, as shown in FIG. 16, the electrode active material maintained a sufficient peak intensity and had a charge-discharge capacity close to the original theoretical capacity thereof without formation of a heterophase. As a result, the combination of the materials containing the phosphate compounds using a common polyanion was considered as a material system satisfying the relation that the temperature, at which the capacity of the electrode active material is lowered by the reaction between the electrode active material and the solid electrolyte material, is higher than the firing shrinkage initiation temperature of the solid electrolyte material.

[Production of All-Solid-State Cell]

All-solid-state cells having electrodes containing the combinations of the electrode active materials and the solid electrolyte materials were produced respectively. The electrode was formed by mixing and firing the electrode active material and the solid electrolyte material of an amorphous LAGP solid electrolyte (an amorphous polyanion (phosphate) compound) in Examples. A crystalline LAGP solid electrolyte was used instead of the amorphous LAGP solid electrolyte in Comparative Examples. Examples and Comparative Examples will be described specifically below.

Example 1

A binder was dissolved in an organic solvent, and an appropriate amount of the resultant solution was added to the LAGP glass powder and the LVP crystal powder. The mixture was kneaded in a mortar to prepare an electrode paste for screen printing. The obtained electrode paste was printed into an electrode pattern having a diameter of 12 mm on each surface of a fired solid electrolyte body (a base) having a diameter of 13 mm and a thickness of 1 mm. The printed electrode patterns were dried to form positive and negative electrodes.

The electrodes were bonded to the surfaces of the solid electrolyte base by firing at 600° C. for 2 hours using a firing furnace under an Ar atmosphere. Then, a sputtered gold (Au) film having a thickness of approximately 50 nm was formed as a collector on each surface of the resultant fired body.

After the firing, the positive electrode had a thickness of approximately 20 µm and an active material content of approximately 2 mg. The charge-discharge capacity per unit weight of the positive electrode was calculated from the active material content, and was shown in a graph.

Example 2

A binder was dissolved in an organic solvent, and an appropriate amount of the resultant solution was added to the LAGP glass powder and the LVP crystal powder. The mixture was kneaded in a mortar to prepare an electrode paste for screen printing. The obtained electrode paste was printed into an electrode pattern and dried on each surface of a fired solid electrolyte body (a base) in the above-mentioned manner, to form positive and negative electrodes.

The electrodes were bonded to the surfaces of the solid electrolyte base by firing at 600° C. for 40 hours using a firing furnace under an Ar atmosphere. Then, a sputtered Au film was formed on each surface of the resultant fired body.

After the firing, the positive electrode had a thickness of approximately 20 μm and an active material content of approximately 2 mg as above.

Comparative Example 1

A binder was dissolved in an organic solvent, and an appropriate amount of the resultant solution was added to the LAGP crystal powder and the LVP crystal powder. The mixture was kneaded in a mortar to prepare an electrode paste for screen printing. The obtained electrode paste was printed into an electrode pattern and dried on each surface of a fired solid electrolyte body (a base) in the above-mentioned manner, to form positive and negative electrodes.

The electrodes were bonded to the surfaces of the solid electrolyte base by firing at 600° C. for 2 hours using a firing furnace under an Ar atmosphere. Then, a sputtered Au film was formed on each surface of the resultant fired body.

After the firing, the positive electrode had a thickness of approximately 20 μm and an active material content of approximately 2 mg as above.

Comparative Example 2

A binder was dissolved in an organic solvent, and an appropriate amount of the resultant solution was added to the LAGP crystal powder and the LVP crystal powder. The mixture was kneaded in a mortar to prepare an electrode paste for screen printing. The obtained electrode paste was printed into an electrode pattern and dried on each surface of a fired solid electrolyte body (a base) in the above-mentioned manner, to form positive and negative electrodes.

The electrodes were bonded to the surfaces of the solid electrolyte base by firing at 700° C. for 2 hours using a firing furnace under an Ar atmosphere. Then, a sputtered Au film was formed on each surface of the resultant fired body.

After the firing, the positive electrode had a thickness of approximately 20 μm and an active material content of approximately 2 mg as above.

[Measurement of Alternating-Current Impedance]

The alternating-current impedance of each all-solid-state cell was measured by using 1287 Potentiostat/Galvanostat (trade name) and 1255B Frequency Response Analyzer (trade name) manufactured by Solartron in combination. The measurement frequency was controlled within the range of 1 MHz to 0.1 Hz, and the measurement signal voltage was 10 mV.

[Evaluation of Charge-Discharge Property]

Each all-solid-state cell was charged and discharged by a CCCV (Constant Current Constant Voltage) process, and the charge-discharge property was evaluated. Specifically, in Examples 1 and 2, the all-solid-state cell was charged at a constant current of 9 μA/cm$^2$ to a cutoff voltage of 2.4 V and then charged at a constant voltage of 2.4 V to a current value of 0.9 μA/cm$^2$, and was discharged at a constant current of 9 μA/cm$^2$ to a cutoff voltage of 0.1 V and then discharged at a constant voltage of 0.1 V to a current value of 0.9 μA/cm$^2$. In Comparative Examples 1 and 2, the all-solid-state cell was charged at a constant current of 0.9 μA/cm$^2$ to a cutoff voltage of 2.4 V and then charged at a constant voltage of 2.4 V to a current value of 0.45 μA/cm$^2$, and was discharged at a constant current of 0.9 μA/cm$^2$ to a cutoff voltage of 0.1 V and then discharged at a constant voltage of 0.1 V to a current value of 0.45 μA/cm$^2$.

(Evaluation)

Each of the produced all-solid-state ceramic cells having the mixture electrodes was vacuum-dried under heating and incorporated in a 2032 coin cell type package to evaluate the electric properties in a glove box. The charge-discharge properties of Examples 1 and 2 and Comparative Examples 1 and 2 are shown in FIGS. 17, 19, 21, and 23. The alternating-current impedances of Examples 1 and 2 and Comparative Examples 1 and 2 are shown in FIGS. 18, 20, 22, and 24. In each alternating-current impedance waveform, the transverse axis indicates the real part Z' of the impedance, the ordinate axis indicates the imaginary part Z" of the impedance, and the measurement frequencies of 1 kHz and 1 Hz are marked with black dots.

(Consideration)

Comparing the charge-discharge capacity, the all-solid-state cells of Comparative Examples 1 and 2 had high internal resistances and were almost incapable of charge and discharge. In Comparative Example 1, a large arc corresponding to the particle boundary resistance was formed in a higher frequency region of more than 1 kHz in the alternating-current impedance waveform, and the solid electrolyte particles were not sufficiently bonded to each other. Thus, the reaction interface area between the solid electrolyte material and the electrode active material was insufficient, whereby the cell of Comparative Example 1 was almost incapable of charge and discharge. In Comparative Example 2, a large arc corresponding to the reaction interface resistance was formed in a lower frequency region of 1 kHz or less in the alternating-current impedance waveform. Thus, a heterophase was formed on the connection interface between the solid electrolyte material and the electrode active material, and the capacity of the electrode active material was lowered, whereby the cell of Comparative Example 2 was almost incapable of charge and discharge.

In contrast, the cell of Example 1 had a low internal resistance and a charge-discharge capacity of approximately 20 mAh/g, and the cell of Example 2 had a charge-discharge capacity of approximately 40 mAh/g. In Examples 1 and 2, each cell had low impedance in terms of both the particle boundary resistance and the interface reaction resistance as shown in the alternating-current impedance waveform, since the solid electrolyte particles were sufficiently bonded in a region of the electrode layer where a defect (formation of a heterophase, reduction in the capacity of the active material, etc.) was not generated between the solid electrolyte material and the electrode active material. The solid electrolyte material and the electrode active material had an increased desirable connection interface, whereby the interface reaction resistance was lowered. Thus, the internal resistance was lowered, so that the resultant cell was capable of charge and discharge.

Example 3

An all-solid-state cell of Example 3 was produced, and the charge/discharge property and the alternating-current impedance property were measured.

In the same manner as Example 1, a binder was dissolved in an organic solvent, and an appropriate amount of the resultant solution was added to the LAGP glass powder and the LVP crystal powder. The mixture was kneaded in a mortar to prepare an electrode paste for screen printing. The obtained electrode paste was printed into an electrode pattern having a diameter of 12 mm on each surface of a fired solid electrolyte body (a base) having a diameter of 13 mm and a thickness of 1 mm. The printed electrode patterns were dried to form positive and negative electrodes.

The electrodes were bonded to the surfaces of the solid electrolyte base by firing while applying a load of 500 kg/cm$^2$ in the thickness direction at 600° C. for 40 hours using a hot-press furnace under an Ar atmosphere. Then, a sputtered gold (Au) film having a thickness of approximately 50 nm was formed as a collector on each surface of the resultant fired body.

After the firing, the positive electrode had a thickness of approximately 20 μm and an active material content of approximately 2 mg as Example 1.

[Measurement of Alternating-Current Impedance]

The alternating-current impedance of the all-solid-state cell was measured by using 1287 Potentiostat/Galvanostat (trade name) and 1255B Frequency Response Analyzer (trade name) manufactured by Solartron in combination in the same manner as Example 1. The measurement frequency was controlled within the range of 1 MHz to 0.1 Hz, and the measurement signal voltage was 10 mV.

[Evaluation of Charge-Discharge Property]

The produced all-solid-state cell was charged and discharged by a CCCV process, and the charge-discharge property was evaluated. Specifically, in Examples 3, the all-solid-state cell was charged at a constant current of 90 μA/cm$^2$ to a cutoff voltage of 2.4 V and then charged at a constant voltage of 2.4 V to a current value of 0.9 μA/cm$^2$, and was discharged at a constant current of 90 μA/cm$^2$ to a cutoff voltage of 0.1 V and then discharged at a constant voltage of 0.1 V to a current value of 0.9 μA/cm$^2$.

(Evaluation)

Figure 25:
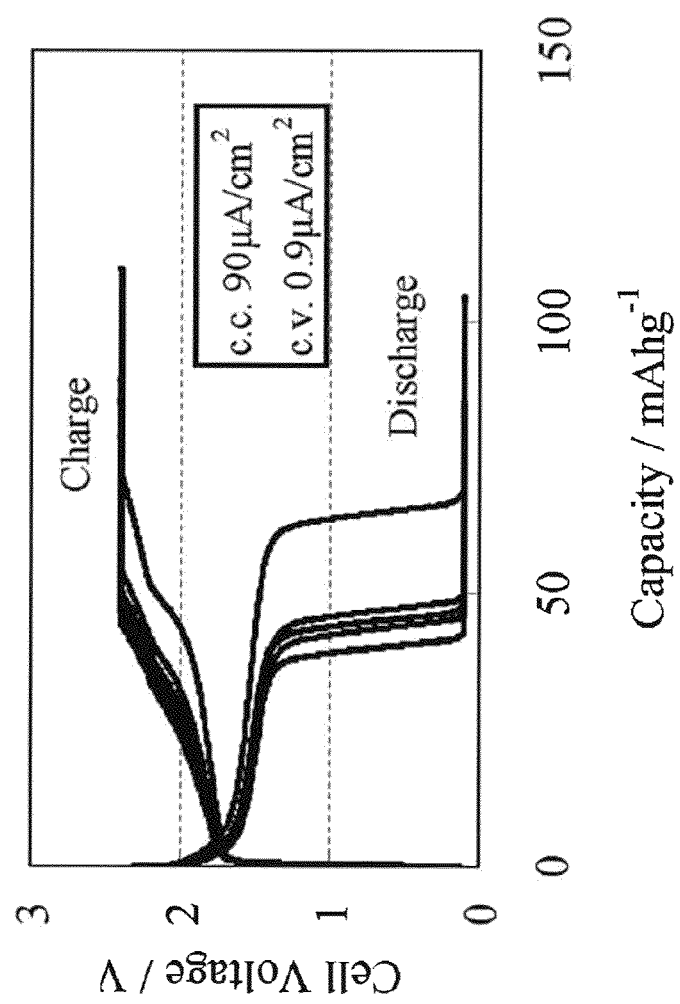
FIG. 25 is a graph showing the charge/discharge property of Example 3.
Figure 26:
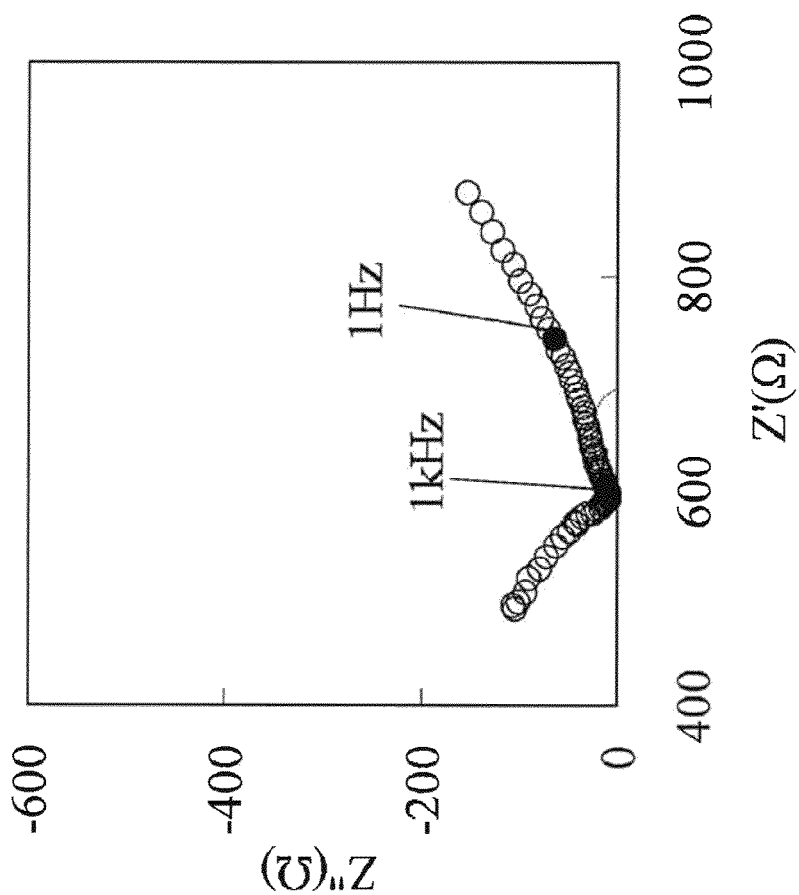
FIG. 26 is a graph showing the alternating-current impedance property of Example 3.

The produced all-solid-state ceramic cell having the mixture electrodes was vacuum-dried under heating and incorporated in a 2032 coin cell type package to evaluate the electric properties in a glove box. The charge-discharge property of Example 3 is shown in FIG. 25, and the alternating-current impedance of Example 3 is shown in FIG. 26. In the alternating-current impedance waveform, the transverse axis indicates the real part Z' of the impedance, the ordinate axis indicates the imaginary part Z" of the impedance, and the measurement frequencies of 1 kHz and 1 Hz are marked with black dots.

(Consideration)

In Example 3, as is clear from FIG. 26, the internal resistance was lowered. The reduction in the reaction resistance (the interface charge transfer resistance) accounts for the majority of the reduction in the internal resistance, and thus the reduction may be achieved due to densification and increase of the connection interface area between the electrode active material and the solid electrolyte material.

It should be understood that the all-solid-state cell of the present invention is not limited to the above embodiment, and various changes and modifications may be made therein without departing from the scope of the invention.

What is claimed is:

1. An all-solid-state cell comprising:
   positive and negative electrode portions containing an electrode active material; and
   an electrolyte portion containing a solid electrolyte;
   wherein one or both of the positive and negative electrode portions comprises a sintered body of a mixture of the electrode active material and an amorphous solid electrolyte material; and
   wherein the electrode active material and the amorphous solid electrolyte material satisfy an inequality:

Ty>Tz wherein Ty is a temperature at which a capacity of the electrode active material is lowered by a reaction between the electrode active material and the amorphous solid electrolyte material, and Tz is a temperature at which the amorphous solid electrolyte material is shrunk by firing.

2. An all-solid-state cell according to claim 1, wherein Tz is a temperature at which the relative density of the solid electrolyte material is increased to 70% or more of the theoretical density thereof due to the shrinkage by firing.

3. An all-solid-state cell according to claim 2, wherein the solid electrolyte material and the electrode active material are Nasicon after the firing.

4. An all-solid-state cell according to claim 2, wherein the solid electrolyte material and the electrode active material are Nasicon, the solid electrolyte material comprises LAGP $Li_{1+x}Al_xGe_{2-x}(PO_4)_3$ (0≤x≤1), and the electrode active material comprises LVP $Li_mV_2(PO_4)_3$ (1≤m≤5) in both the positive and negative electrode portions, whereby the all-solid-state cell has a symmetrical structure.

5. An all-solid-state cell according to claim 1, wherein the solid electrolyte material comprises an amorphous polyanion compound, and the one or both of the positive and negative electrode portions are formed by mixing and firing the electrode active material and the solid electrolyte material.

6. An all-solid-state cell according to claim 1, wherein the solid electrolyte material comprises an amorphous phosphate compound, and the one or both of the positive and negative electrode portions are formed by mixing and firing the electrode active material and the solid electrolyte material.

7. An all-solid-state cell according to claim 6, wherein the solid electrolyte material comprising the phosphate compound is Nasicon after the firing.

8. An all-solid-state cell according to claim 7, wherein the phosphate compound of the solid electrolyte material is LAGP $Li_{1-x}Al_xGe_{2-x}(PO_4)_3$ (0≤x≤1).

9. An all-solid-state cell according to claim 7, wherein the phosphate compound of the solid electrolyte material is LATP $Li_{1+x}Al_xTi_{2-x}(PO_4)_3$ (0≤x≤1).

10. An all-solid-state cell according to claim 1, wherein the electrode active material is a Nasicon material comprising a phosphate compound.

11. An all-solid-state cell according to claim 10, wherein the phosphate compound of the electrode active material is LVP $Li_mV_2(PO_4)_3$ (1≤m≤5).

12. An all-solid-state cell according to claim 1, wherein the electrode active material for the positive electrode portion is an olivine positive electrode active material comprising a phosphate compound.

13. An all-solid-state cell according to claim 12, wherein the phosphate compound of the positive electrode active material is LNP $Li_nNiPO_4$, LCP $Li_nCoPO_4$, LMP $Li_nMnPO_4$ or LFP $Li_nFePO_4$ (0≤n≤1).

14. An all-solid-state cell according to claim 1, wherein one or both of the positive and negative electrode portions are formed by firing under an applied pressure.

15. An all-solid-state cell according to claim 1, wherein one or both of the positive and negative electrode portions are formed from a paste for printing by firing it under an inert atmosphere.

16. An all-solid-state cell according to claim 1, wherein a solid electrolyte network is formed in the one or both of the positive and negative electrode portions.

17. An all-solid-state cell according to claim 1, wherein, in the sintered body of the mixture, the amorphous solid electrolyte material has been fired at a temperature above a glass transition point of the amorphous solid electrolyte material, whereby the one or both of the positive and negative electrode portions and the electrolyte portion are integrally formed with respect to each other.

18. An all-solid-state cell according to claim 1, wherein the electrolyte portion is composed of a crystalline solid electrolyte.

\* \* \* \* \*